(12) United States Patent
Lynch

(10) Patent No.: US 12,282,707 B2
(45) Date of Patent: *Apr. 22, 2025

(54) TECHNIQUES FOR EXTENDING THE LIFESPAN OF PLAYBACK DEVICES

(71) Applicant: Sonos, Inc., Santa Barbara, CA (US)

(72) Inventor: John Lynch, Malden, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,136

(22) Filed: Nov. 6, 2023

(65) Prior Publication Data

US 2024/0069853 A1    Feb. 29, 2024

Related U.S. Application Data

(63) Continuation of application No. 17/471,388, filed on Sep. 10, 2021, now Pat. No. 11,809,778.

(60) Provisional application No. 63/077,372, filed on Sep. 11, 2020.

(51) Int. Cl.
    G06F 15/16    (2006.01)
    G06F 3/16     (2006.01)
    H04L 43/16    (2022.01)
    H04L 67/12    (2022.01)

(52) U.S. Cl.
    CPC .............. *G06F 3/165* (2013.01); *H04L 43/16* (2013.01); *H04L 67/12* (2013.01)

(58) Field of Classification Search
    CPC .......... G06F 3/165; H04L 43/16; H04L 67/12
    See application file for complete search history.

(56) References Cited

U.S. PATENT DOCUMENTS

| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Normin Abedin

(57) ABSTRACT

While operating in a first mode, a computing device transmits, to playback devices of a synchrony group, (i) media content and (ii) respective playback timing information for synchronous playback of the media content. After a first playback device with a different capability than at least one other playback device of the synchrony group has joined the synchrony group, the computing device begins to operate in a second mode for causing one or more of the playback devices of the synchrony group to modify playback of the media content based on a respective playback device capability. While operating in the second mode, the computing device (i) determines a modified sample rate for the first playback device to maintain synchrony of playback of the media content between the playback devices of the synchrony group, and (ii) causes the first playback device to play back the media content at the modified sample rate.

20 Claims, 19 Drawing Sheets

(56) References Cited

U.S. PATENT DOCUMENTS

| | | |
|---|---|---|
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2017/0262257 A1* | 9/2017 | Lin ................... H04R 27/00 |
| 2018/0308518 A1* | 10/2018 | Leonard ............. H03G 3/02 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Jan. 20, 2023, issued in connection with U.S. Appl. No. 17/471,388, filed Sep. 10, 2021, 14 pages.
Notice of Allowance mailed on Aug. 9, 2023, issued in connection with U.S. Appl. No. 17/471,388, filed Sep. 10, 2021, 10 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

TECHNIQUES FOR EXTENDING THE LIFESPAN OF PLAYBACK DEVICES

CROSS REFERENCE TO RELATED APPLICATIONS

This application claims priority to, and is a continuation of, U.S. patent application Ser. No. 17/471,388, filed on Sep. 10, 2021, and titled "Techniques for Extending the Lifespan of Playback Devices," which claims priority to U.S. Provisional Patent Application No. 63/077,372, filed on Sep. 11, 2020, titled "Techniques for Extending the Lifespan of Playback Devices," the contents of each of which are incorporated herein by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
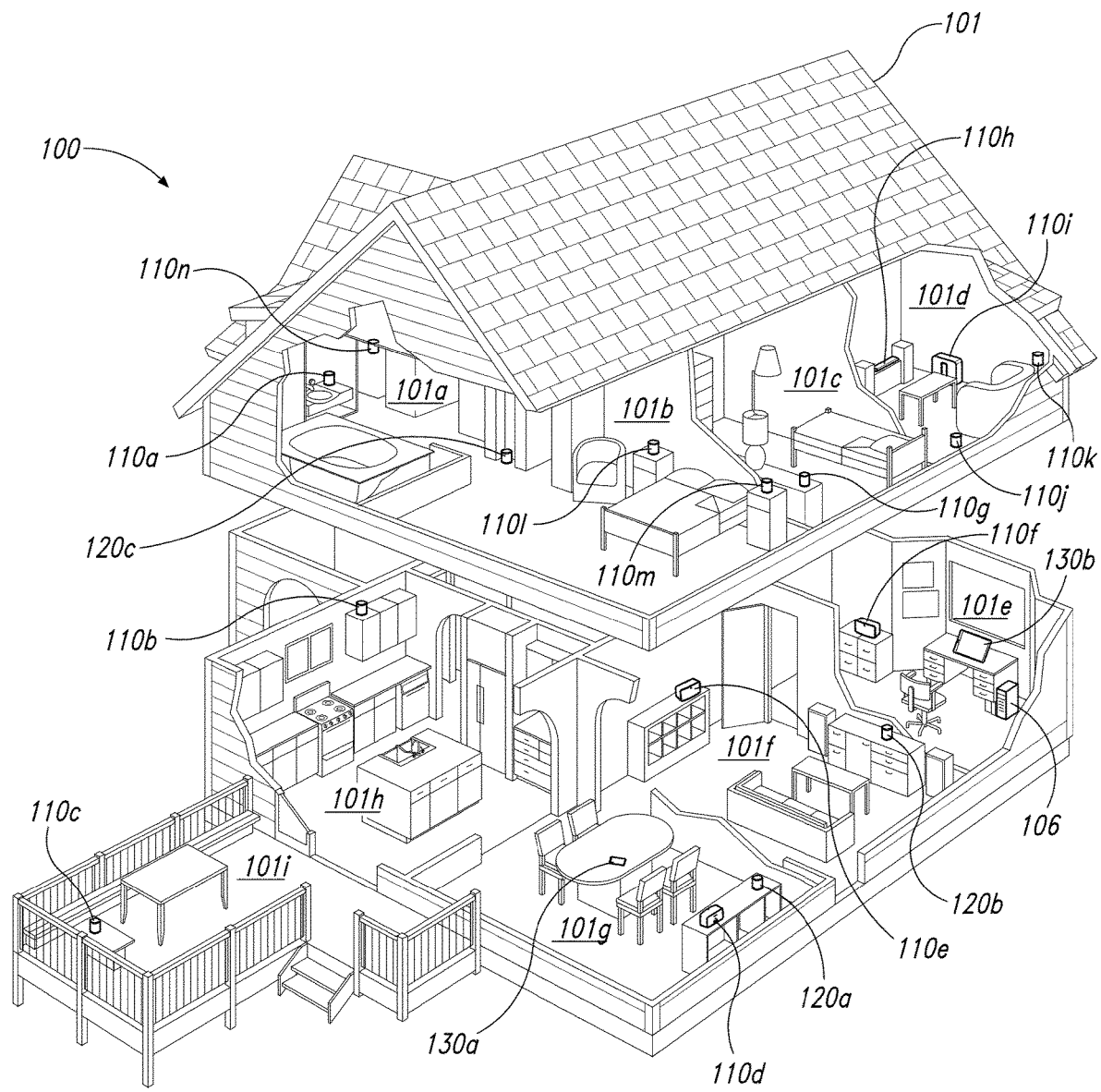
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

SONOS, Inc. has consistently bucked the trend of selling consumer electronics with ever shorter lifespans before needing to purchase a newer version of the product. Instead of developing products only intended to last a matter of months, SONOS, Inc. has developed products that are intended to be enjoyed by listeners for years demonstrating a commitment to ethical and sustainable practices. Building consumer electronics that are intended to be in the homes of users for such a long period of time (e.g., multiple times the average life span of consumer electronics) brings about a host of unique technical challenges.

One technical challenge faced in designing products intended for use for long periods of time is the ever increasing computational and memory requirements of modern software. For example, the processing requirements for an Internet-Of-Things (IoT) device to execute the latest (and most secure) version of software (e.g., an operating system, such as an operating system based on LINUX) typically increases with each new version. In the context of playback devices, the computational demands (e.g., memory requirements, processor requirements, networking requirements, etc.) for the latest generation of player software are increasing with the trend towards support for: (1) higher quality streaming audio (e.g., higher bitrate audio, more audio channels, etc.); (2) more streaming services; and (3) larger synchrony groups. In a conventional approach where users are frequently forced to upgrade their consumer electronic devices, the capability of the internal hardware is successively increased with each upgrade to match the increasing software requirements. Further, those older consumer electronic devices that do not have the latest internal hardware (and no longer are capable of executing the latest instantiation of software) would have support discontinued.

One approach to attempt to make products last for multiple years through successively increasing software demands would be to simply employ the highest performing hardware internals available at the time. However, integrating the highest performing hardware internals available would unnecessarily increase the cost of the IoT device (e.g., to a point where the price is unpalatable to consumers) and undesirably increase the power consumption of the IoT device over the lifespan of the device. Further, incorporating the best hardware available is insufficient to futureproof products beyond a few years at least because modern software is typically created to take advantage of new hardware designs. For example, the latest version of a given piece of software may be highly multi-threaded so as to be optimized for the latest generation of high core-count processors. In this example, the software may not be easily executed by even the best lower core-count processor available just a few years prior.

SONOS, Inc. has appreciated that the computational demand for playback may depend on the particular role of the playback device in, for example, a synchrony group. For example, to facilitate synchronous playback, a playback device may be configurable to operate in (and/or switch between) a group coordinator mode, a group member mode, and/or a standalone mode. While operating in the group coordinator mode, the playback device may be configured to coordinate playback within the group by, for example, performing one or more of the following functions: (i) obtaining audio content from an audio source, (ii) using a clock (e.g., a physical clock or a virtual clock) in the playback device to generate playback timing information for the audio content, (iii) transmitting portions of the audio content and playback timing for the portions of the audio content to at least one other playback device (e.g., at least one other playback device operating in a group member mode), and/or (iv) playing back the audio content in synchrony with the at least one other playback device using the generated playback timing information. While operating in the group member mode, the playback device may be configured to perform one or more of the following functions: (i) receiving audio content and playback timing for the audio content from the at least one other device (e.g., a playback device operating in a group coordinator mode); (ii) identifying a difference in clock time and/or rate between the clock time and/or rate of the playback device and the clock time and/or rate of another device (e.g., a group coordinator); (iii) converting a sample rate of the audio content from a first sample rate to a second sample rate (e.g., based on the determined difference in clock time and/or rate); and (iv) playing the audio content in synchrony with at least the other playback device using the playback timing for the audio content. While operating in the standalone mode, the playback device may be configured to perform one or more functions from the group member mode and/or one or more functions from the group coordinator mode. For example, a playback device may be configured to perform one or more of the following functions while operating in a standalone mode: (i) obtaining audio content from an audio source; and (ii) playing the audio content.

While a playback device operates in a group coordinator mode and/or a standalone mode, a significant contributor to the computational burden on the playback device may be caused by the software configured to facilitate interaction with cloud servers associated with third-party music streaming service providers to obtain audio content. For example, the third-party music streaming service provider may provide third-party software that is to be installed on the playback device to facilitate proper authentication with the cloud servers associated with the third-party music streaming service provider to access audio content for a given user. Such third-party software is typically continually updated by the third-party and may have ever increasing processing and/or memory requirements.

While a playback device operates in a group member mode, a significant contributor to the computational burden on the playback device is attributable to asynchronous sample rate conversion (SRC) (e.g., to facilitate synchronous playback). Asynchronous SRC may be employed to compensate for a difference in clock rates of clocks on different devices (e.g., differences in clock rates between a playback device designated as the group coordinator and a player designated as a group member). For example, the clock rate on a first device may be slightly different (e.g., faster or slower) than the clock rate on a second device due to any of a variety of factors (e.g., manufacturing differences, temperature, age, etc.). In order to compensate for such differing clock rates during audio playback, asynchronous SRC may be employed to dynamically adjust a number of samples in a given section of audio (e.g., such that the section of audio is played back at the correct rate when the samples are read into a digital-to-analog converter (DAC) for playback).

Accordingly, aspects of the present disclosure describe techniques for advantageously reducing the computational burden on a playback device during playback when operating in any of a variety of modes (e.g., a group coordinator mode, a group member mode, a standalone mode, or any combination thereof). By reducing the computational burden on a playback device during playback, the lifetime of a given playback device may be advantageously increased. For example, the necessity to upgrade the hardware of the playback device in lock-step with software upgrades may be removed.

In some embodiments, the computational burden on a playback device during playback is mitigated by intelligently migrating one or more functions conventionally performed by the playback device (e.g., operating in a group coordinator mode, a group member mode, and/or a standalone mode) to one or more other devices (e.g., cloud servers, other devices on a common local area network (LAN), etc.). For example, the functions typically performed by a group coordinator and at least one of the functions typically performed by a group member (e.g., calculating a difference in playback rates between the device and another device) may be migrated to at least one other device not playing back the media content (e.g., an otherwise idle playback device on the LAN, a cloud server, etc.). In this example, the playback devices performing those functions of the group member not migrated to the other device may operate in one or more new modes. Such new modes where a playback device plays back audio with the support of at least one other device not playing back audio are referred to herein as "lite modes," such as a lite group member mode. In a lite group member mode, the computational burden on the playback device may be advantageously reduced without reducing the functionality of the playback device from the perspective of the user. Thus, older playback devices that, given the latest software update, can no longer function as a group coordinator or a group member can still be used in lite group member mode.

The at least one other device performing the functions of the group coordinator and at least one function of a group member may operate in one or more new modes referred to herein as "super modes," such as a super group coordinator mode. The device functioning in the super group coordinator mode may be a more powerfully device (and/or system) that may support one or more less powerful devices (e.g., older devices) operating in a lite group member mode. In some instances, the device operating in super group coordinator mode may be local relative to the devices operating in the lite group member mode. For example, a new standalone device with the latest hardware may be purchased by an end-user and connected to their wireless local area network (WLAN), such as their WIFI network, to enable support for one or more existing playback devices on their WIFI network to function in lite group coordinator mode. In other instances, the device operating in super group coordinator mode may be remote relative to the devices operating in the lite group member mode. For example, a user may subscribe to a service that provides access to one or more servers (e.g., cloud-based servers) functioning as super group coordinators that playback devices connected to a WLAN associated with the user may access via a wide area network (WAN), such as the Internet.

With the creation of lite modes and super modes as described herein, the usable lifetime of a playback device may be advantageously increased without substantially increasing the cost of such a playback device. For example, a new playback device may operate in one or more of a first set of operating modes that are more computationally burdensome (e.g., a group coordinator mode, a group member mode, a standalone mode, and/or a super mode variant of any of the preceding modes) and seamlessly be transitioned to a second set of operating modes that are less computationally burdensome (e.g., a lite variant of any of a group coordinator mode, a group member mode, and/or a standalone mode) when the playback device no longer meets the computational requirements of modern software. As a result, a core level of functionality may be maintained for a user well beyond the normal lifespan of typical electronic products.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
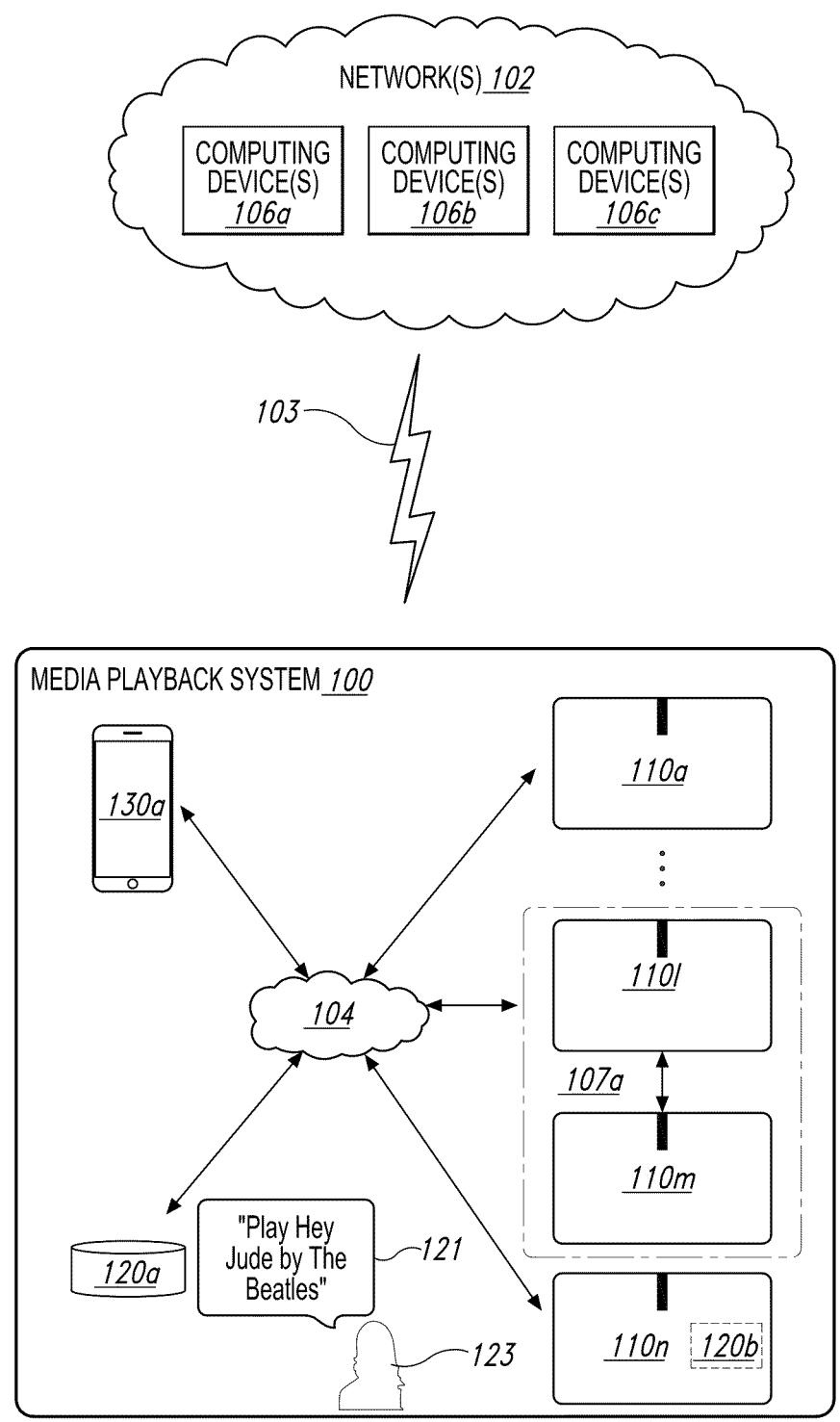
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN) (e.g., the Internet), one or more local area networks (LAN) (e.g., one or more WIFI networks), one or more personal area networks (PAN) (e.g., one or more BLUETOOTH networks, Z-WAVE networks, wireless Universal Serial Bus (USB) networks, ZIGBEE networks, and/or IRDA networks), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct or indirect connections, PANs, LANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1I through IM.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
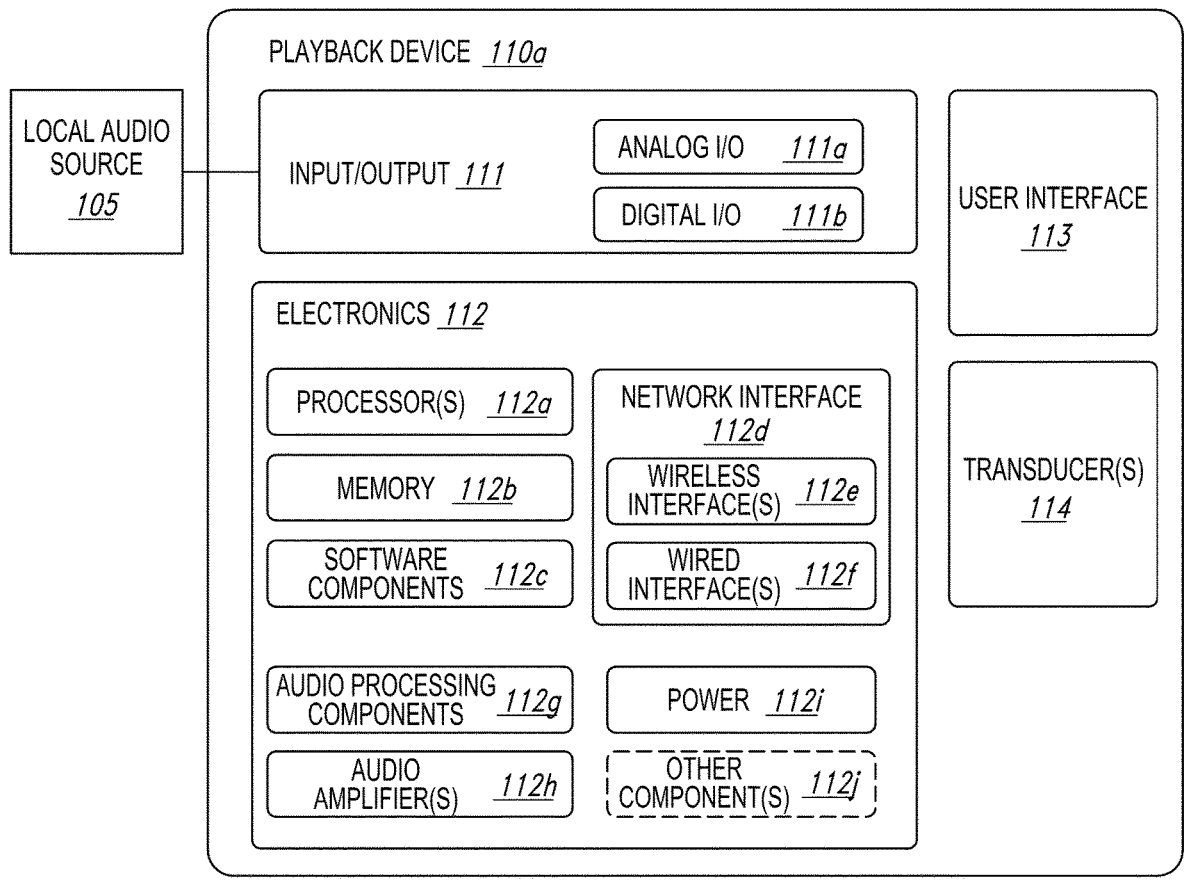
FIG. 1C shows a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio information from an audio source (e.g., one or more of the computing devices 106a-c (FIG. 1B)), and/or another one of the playback devices 110. In some embodiments, the operations further include causing the playback device 110a to send audio information to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals.

In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). The headphone may comprise a headband coupled to one or more earcups. For example, a first earcup may be coupled to a first end of the headband and a second earcup may be coupled to a second end of the headband that is opposite the first end. Each of the one or more earcups may house any portion of the electronic components in the playback device, such as one or more transducers. Further, the one or more of earcups may include a user interface for controlling operation of the headphone such as for controlling audio playback, volume level, and other functions. The user interface may include any of a variety of control elements such as buttons, knobs, dials, touch-sensitive surfaces, and/or touch-screens. An ear cushion may be coupled each of the one or more earcups. The ear cushions may provide a soft barrier between the head of a user and the one or more earcups to improve user comfort and/or provide acoustic isolation from the ambient (e.g., provide passive noise reduction (PNR)). Additionally (or alternatively), the headphone may employ active noise reduction (ANR) techniques to further reduce the user's perception of outside noise during playback.

Figure 1D:
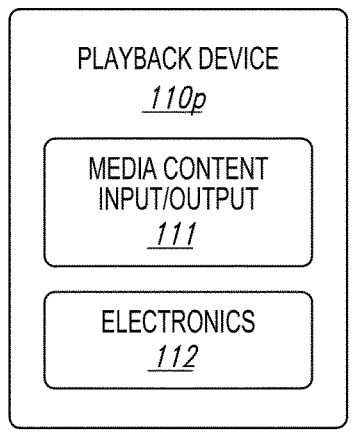
FIG. 1D shows a block diagram of a playback device.

In some embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
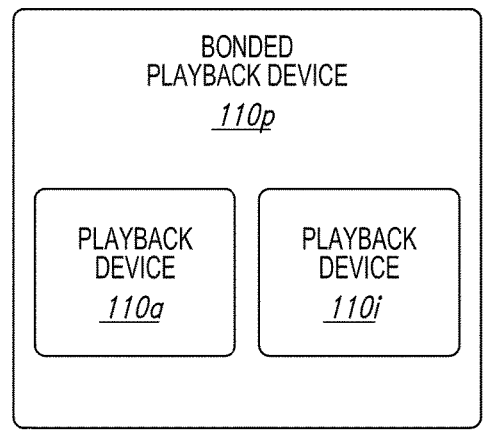
FIG. 1E shows a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

Figures 1F, 1G:
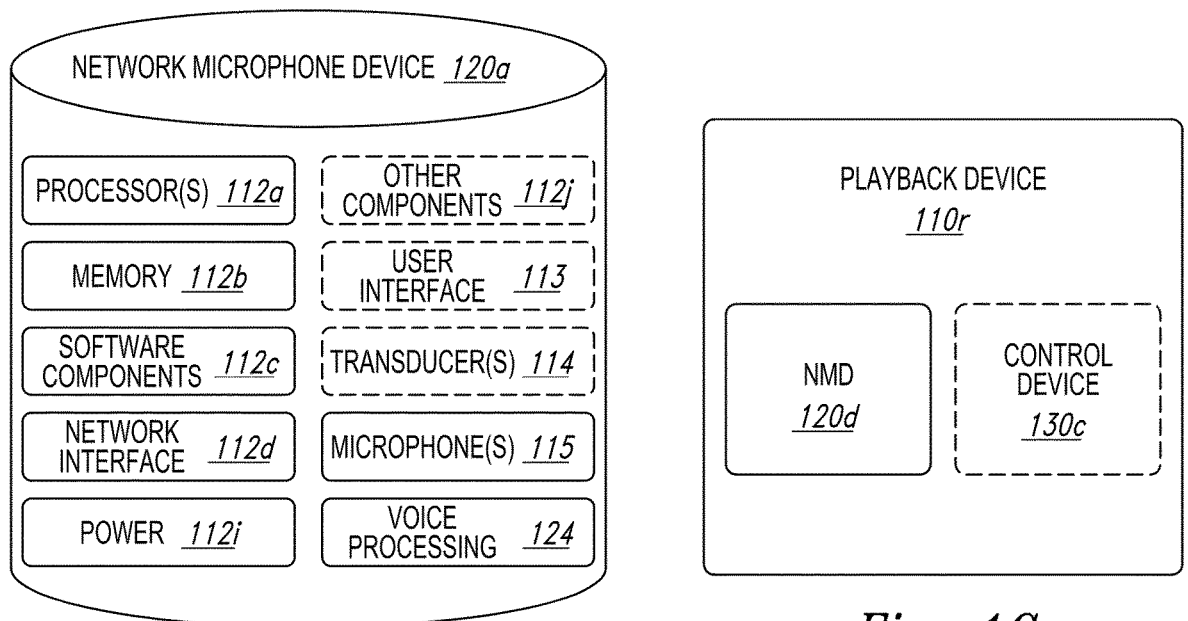
FIG. 1F shows a block diagram of a network microphone device.
FIG. 1G shows a block diagram of a playback device.

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

Figure 1H:
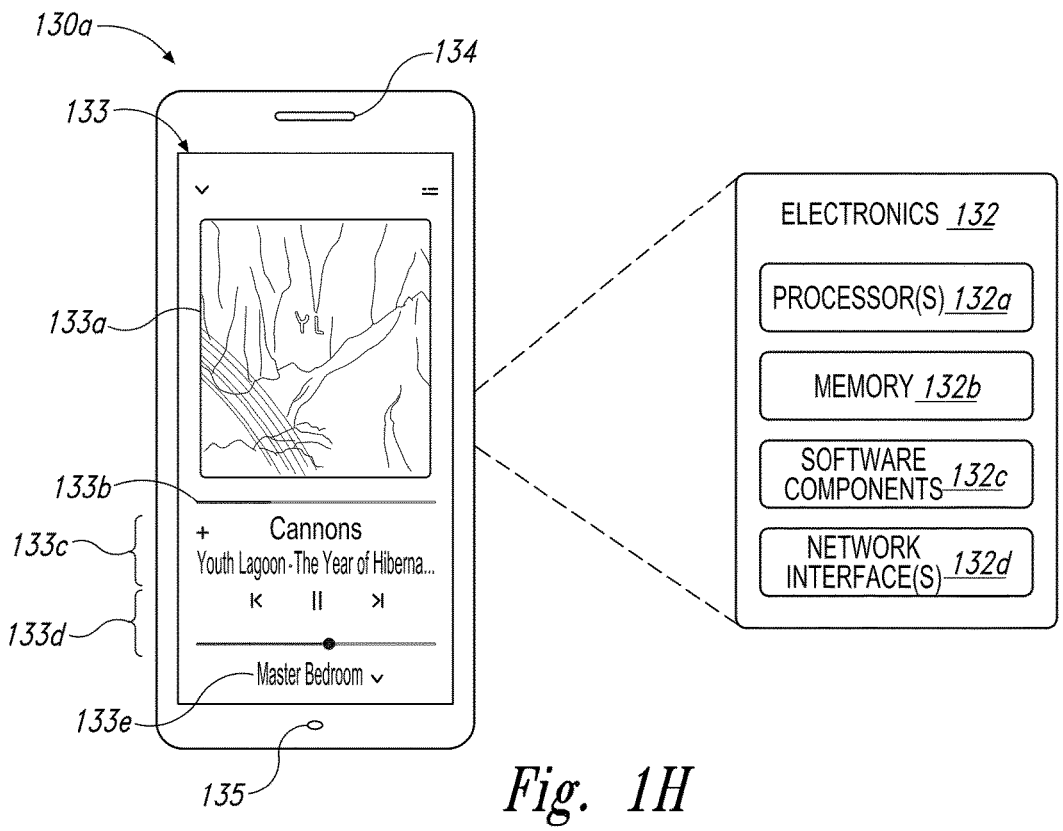
FIG. 1H shows a partially schematic diagram of a control device.

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as a playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1I:
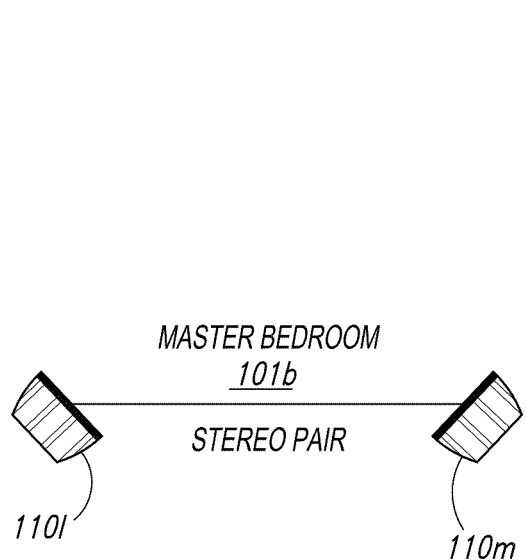
FIGS. 1I through 1L show schematic diagrams of corresponding media playback system zones.
Figure 1J:
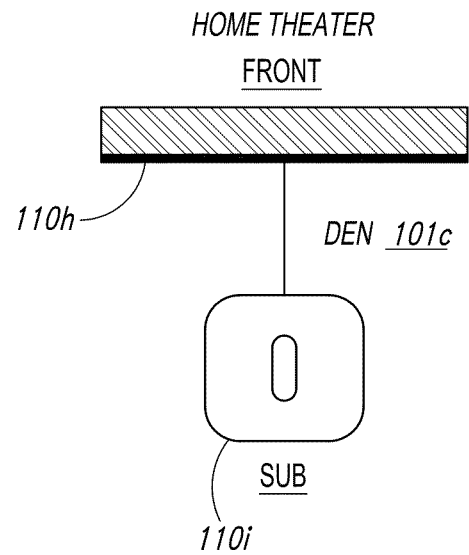
Figure 1K:
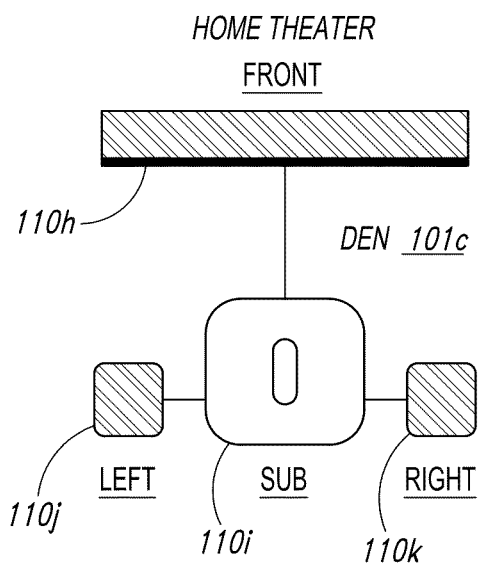
Figure 1L:
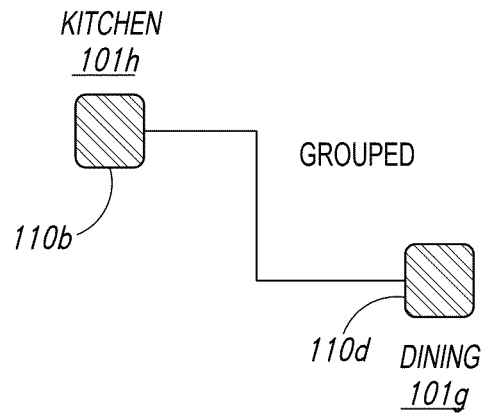
Figure 1M:
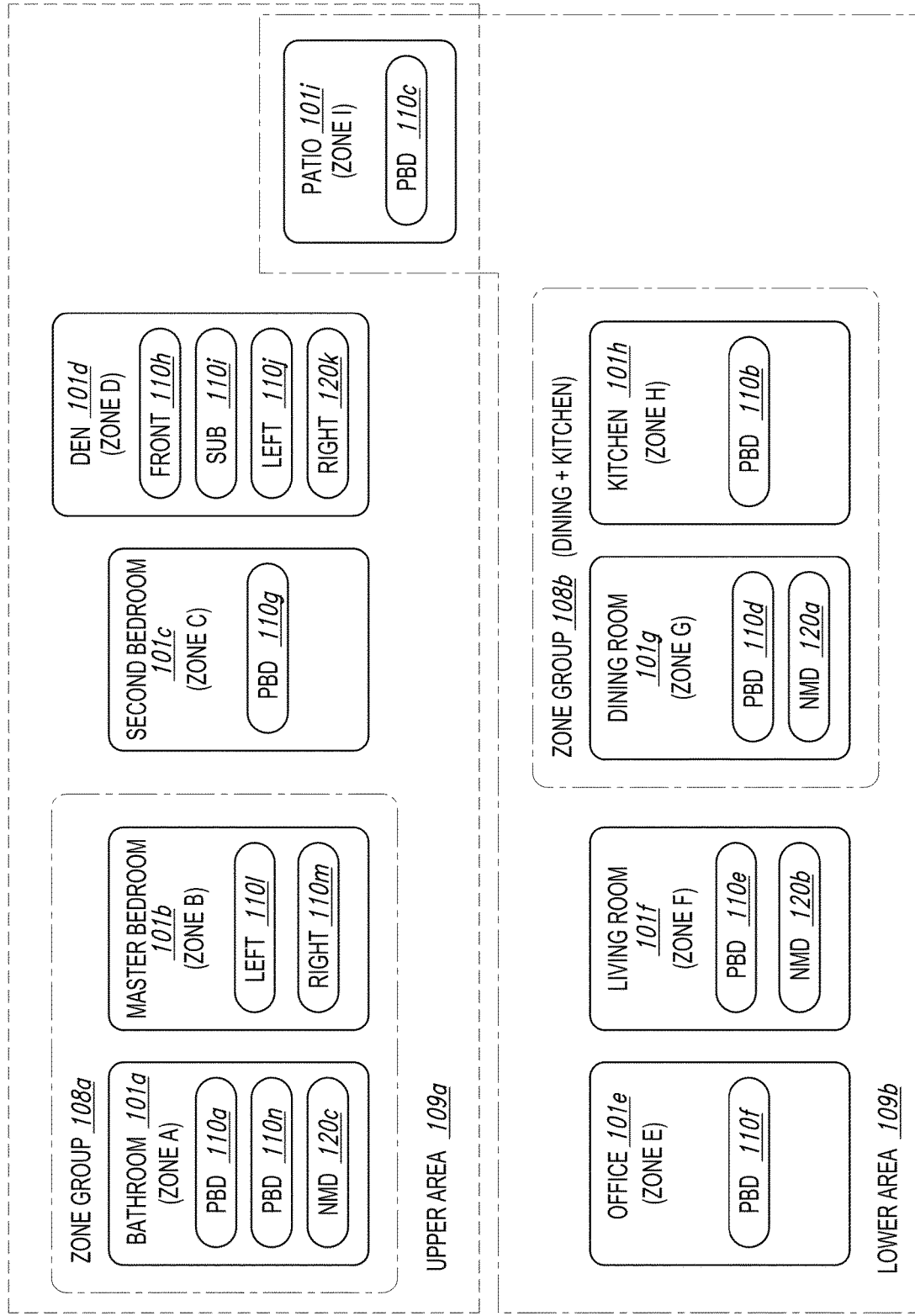
FIG. 1M shows a schematic diagram of media playback system areas.

FIGS. 1I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
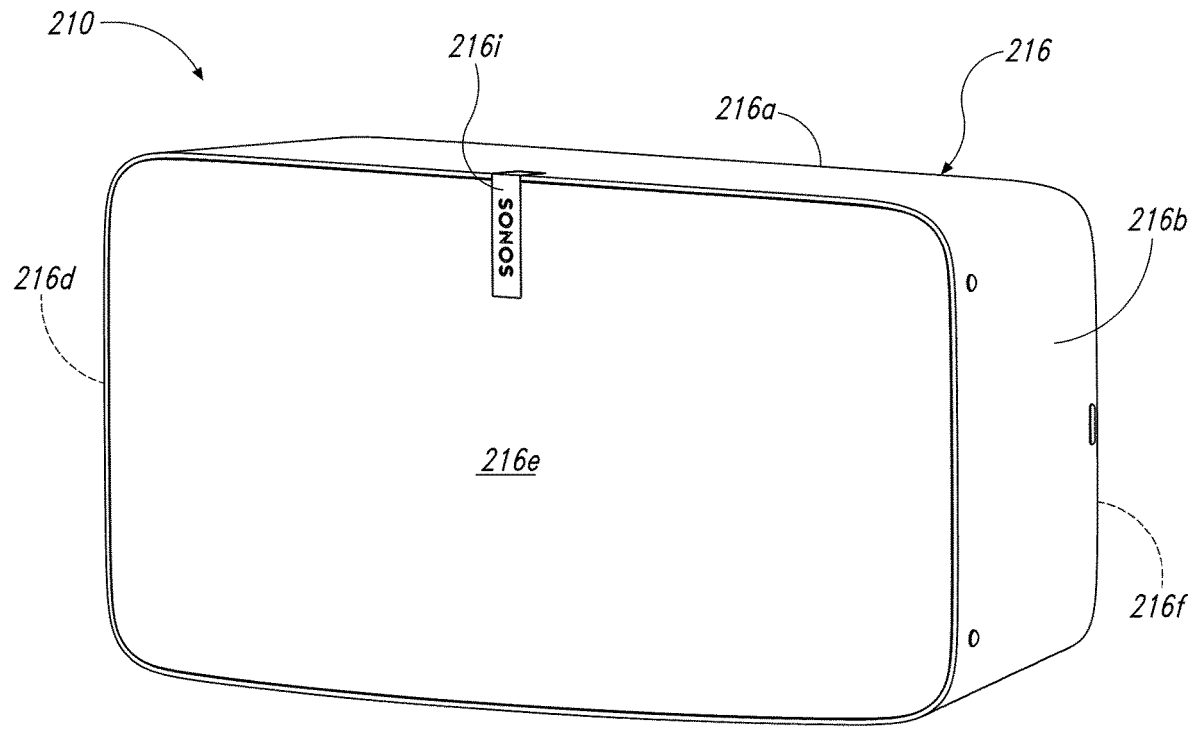
FIG. 2A shows a front isometric view of a playback device configured in accordance with aspects of the disclosed technology.
Figure 2B:
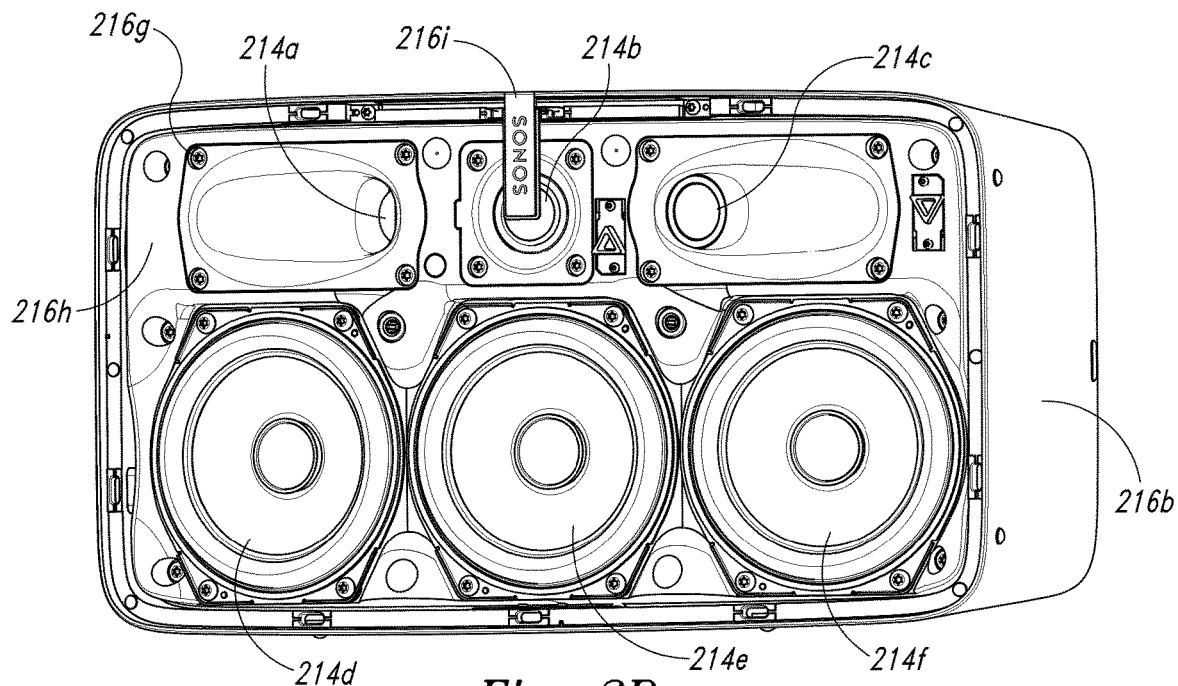
FIG. 2B shows a front isometric view of the playback device of FIG. 3A without a grille.
Figure 2C:
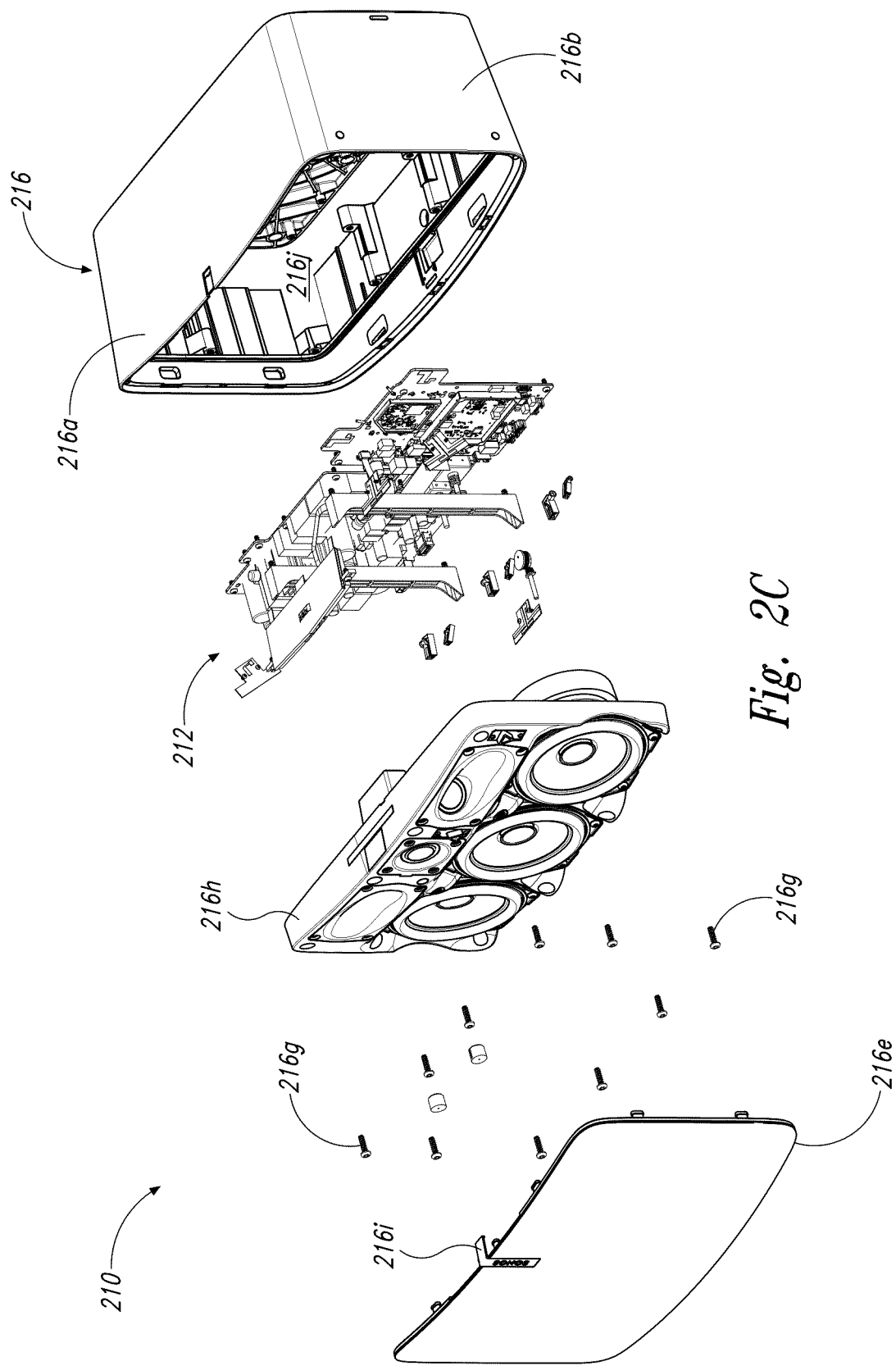
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
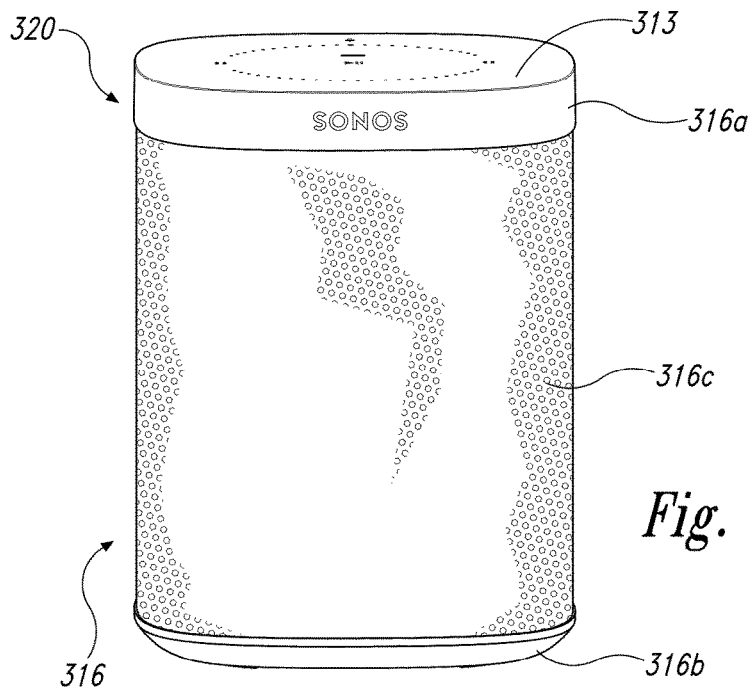
FIG. 3A shows a front view of a network microphone device configured in accordance with aspects of the disclosed technology.
Figure 3B:
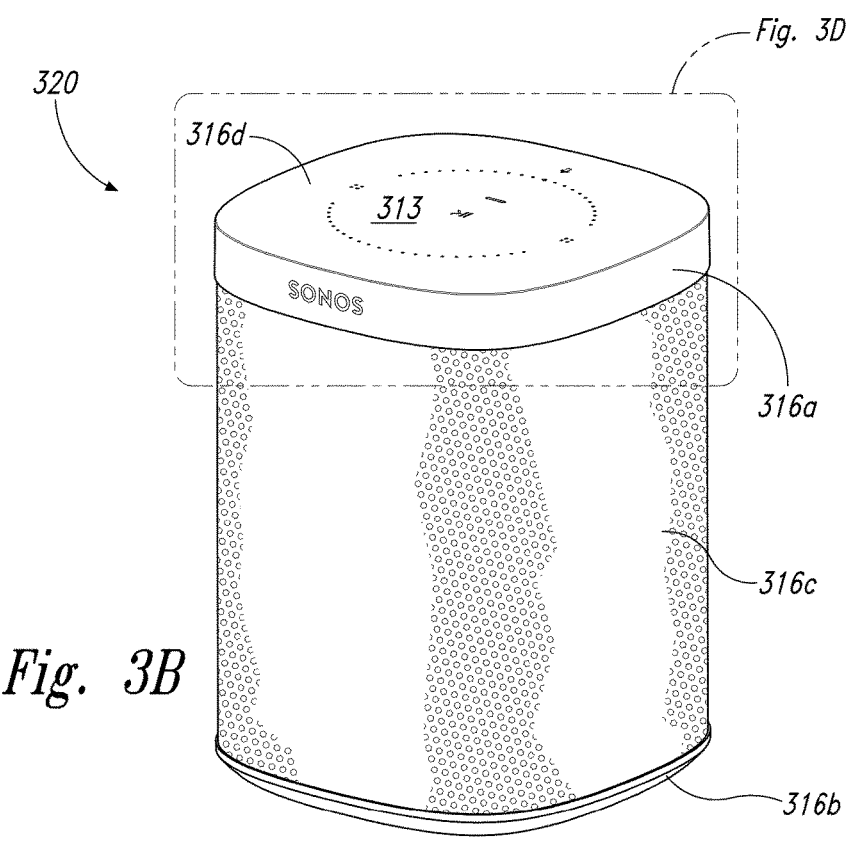
FIG. 3B shows a side isometric view of the network microphone device of FIG. 3A.
Figure 3C:
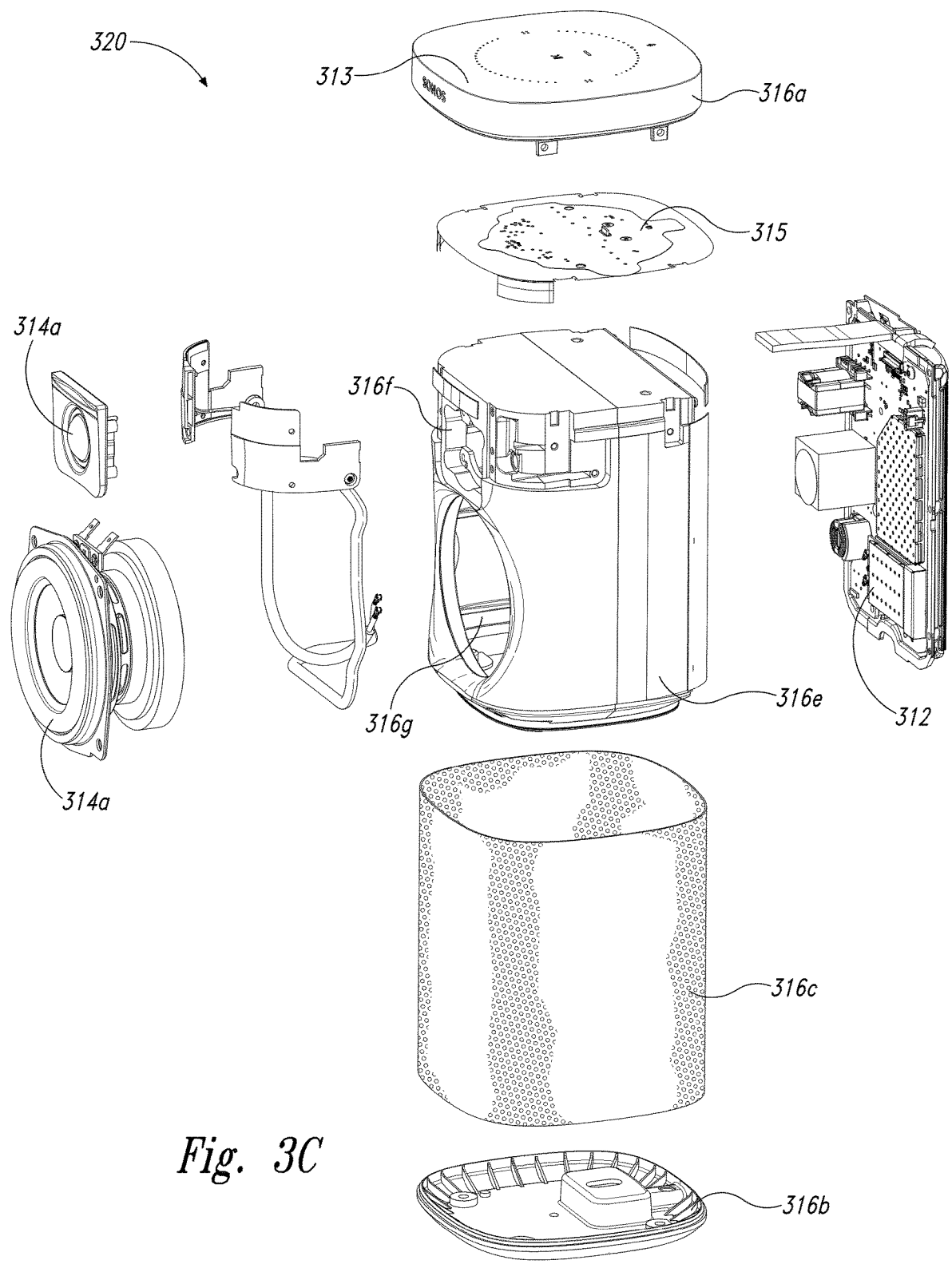
FIG. 3C shows an exploded view of the network microphone device of FIGS. 3A and 3B.
Figure 3D:
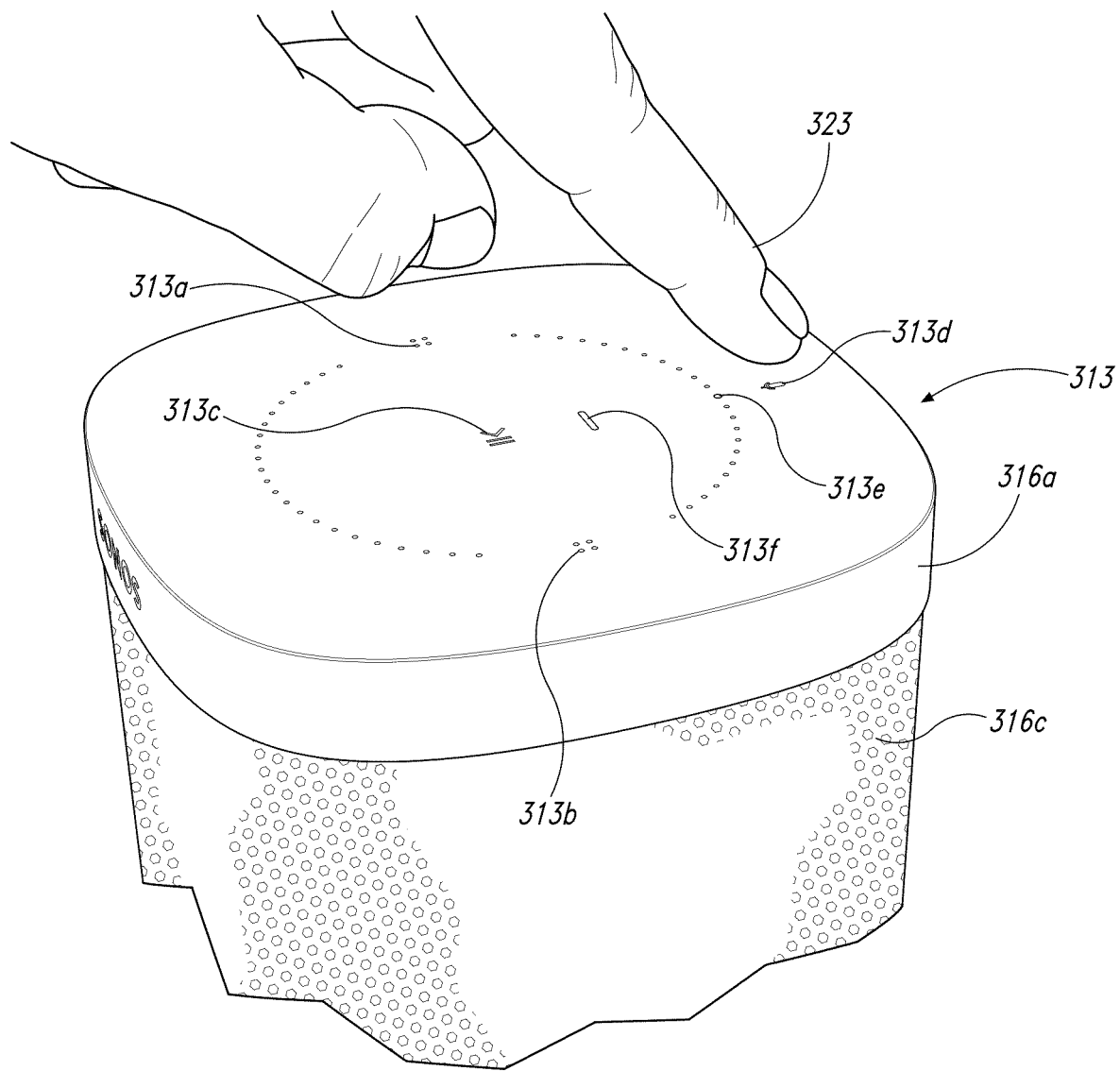
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 315 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
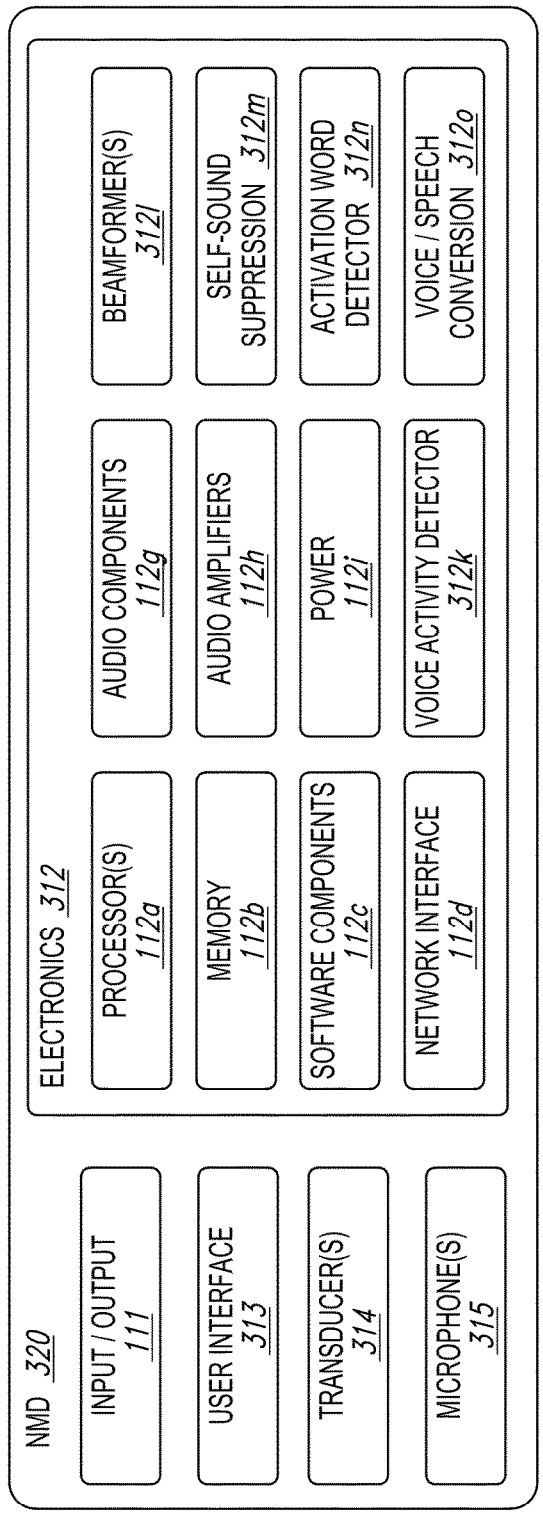
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector 312n, and speech/text conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector 312*n* are configured to monitor and analyze received audio to determine if any activation words (e.g., wake words) are present in the received audio. The activation word detector 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 312*o* may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
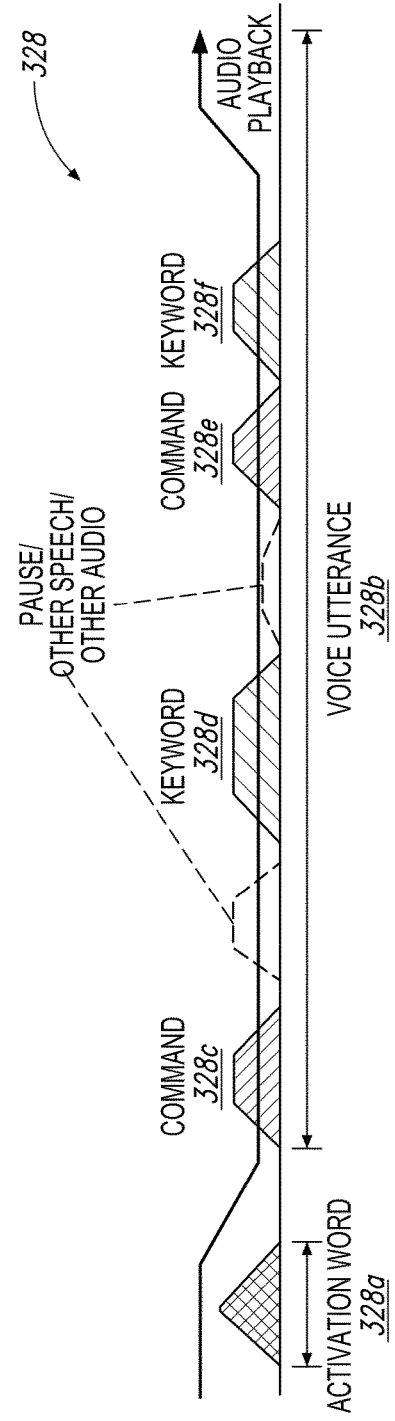
FIG. 3F shows a schematic diagram of an example voice input.

FIG. 3F is a schematic diagram of an example voice input 328 captured by the NMD 320 in accordance with aspects of the disclosure. The voice input 328 can include an activation word portion 328*a* and a voice utterance portion 328*b*. In some embodiments, the activation word 328*a* can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word 328*a*. In addition or alternately, an NMB may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 328*f*). In one example, the first command 328*c* can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some embodiments, the media playback system 100 is configured to temporarily reduce the volume of audio content that it is playing while detecting the activation word portion 557*a*. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
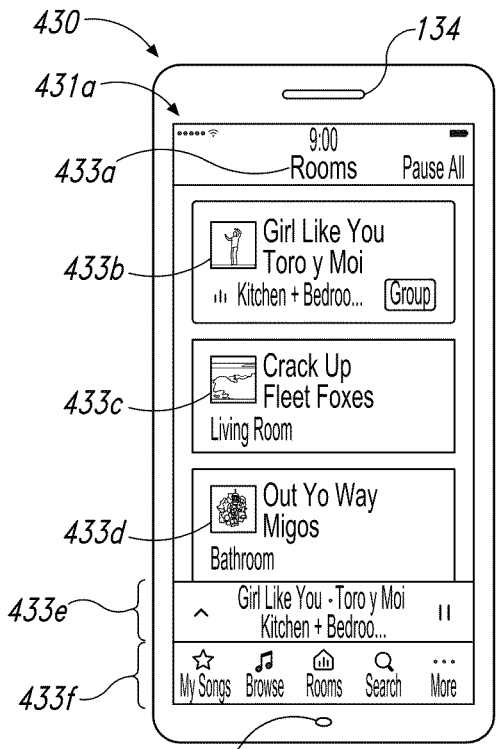
FIGS. 4A-4D show schematic diagrams of a control device in various stages of operation in accordance with aspects of the disclosed technology.
Figure 4B:
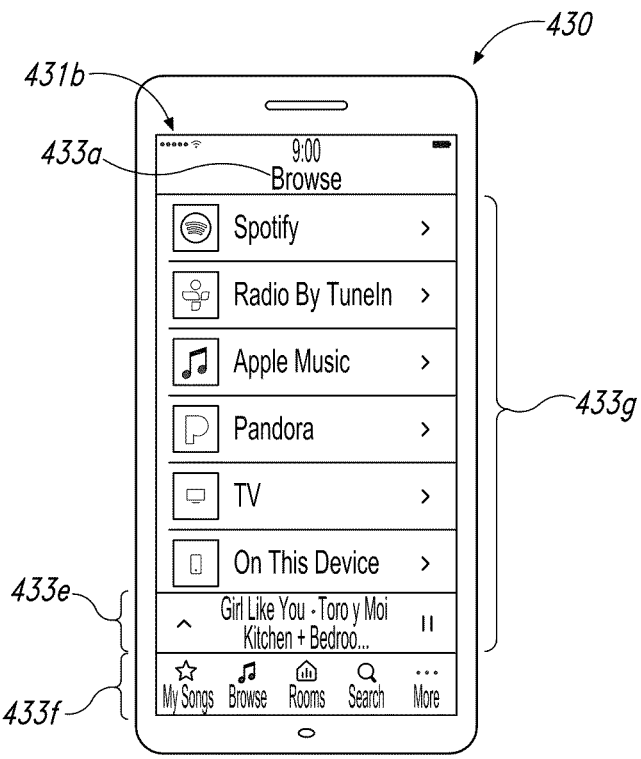
Figure 4C:
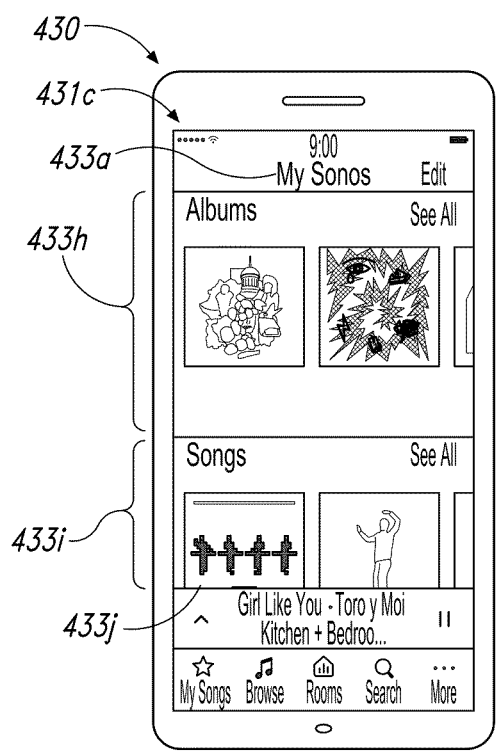
Figure 4D:
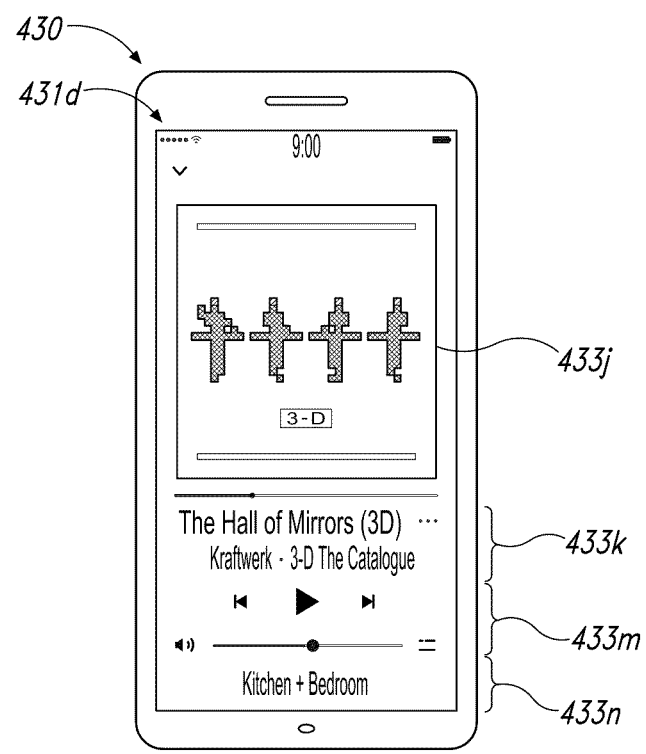

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* that includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
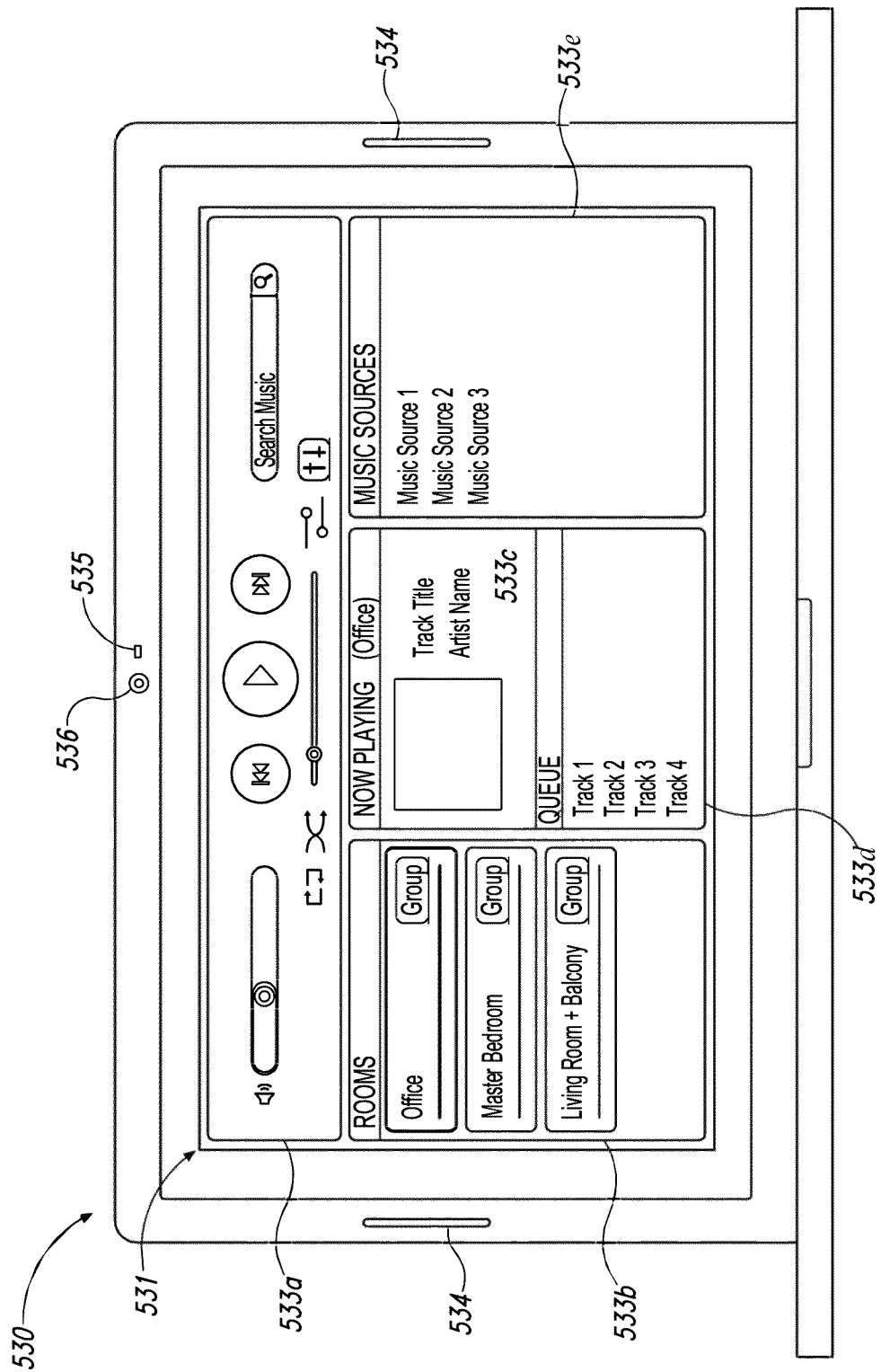
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback zone region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The media content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as a playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
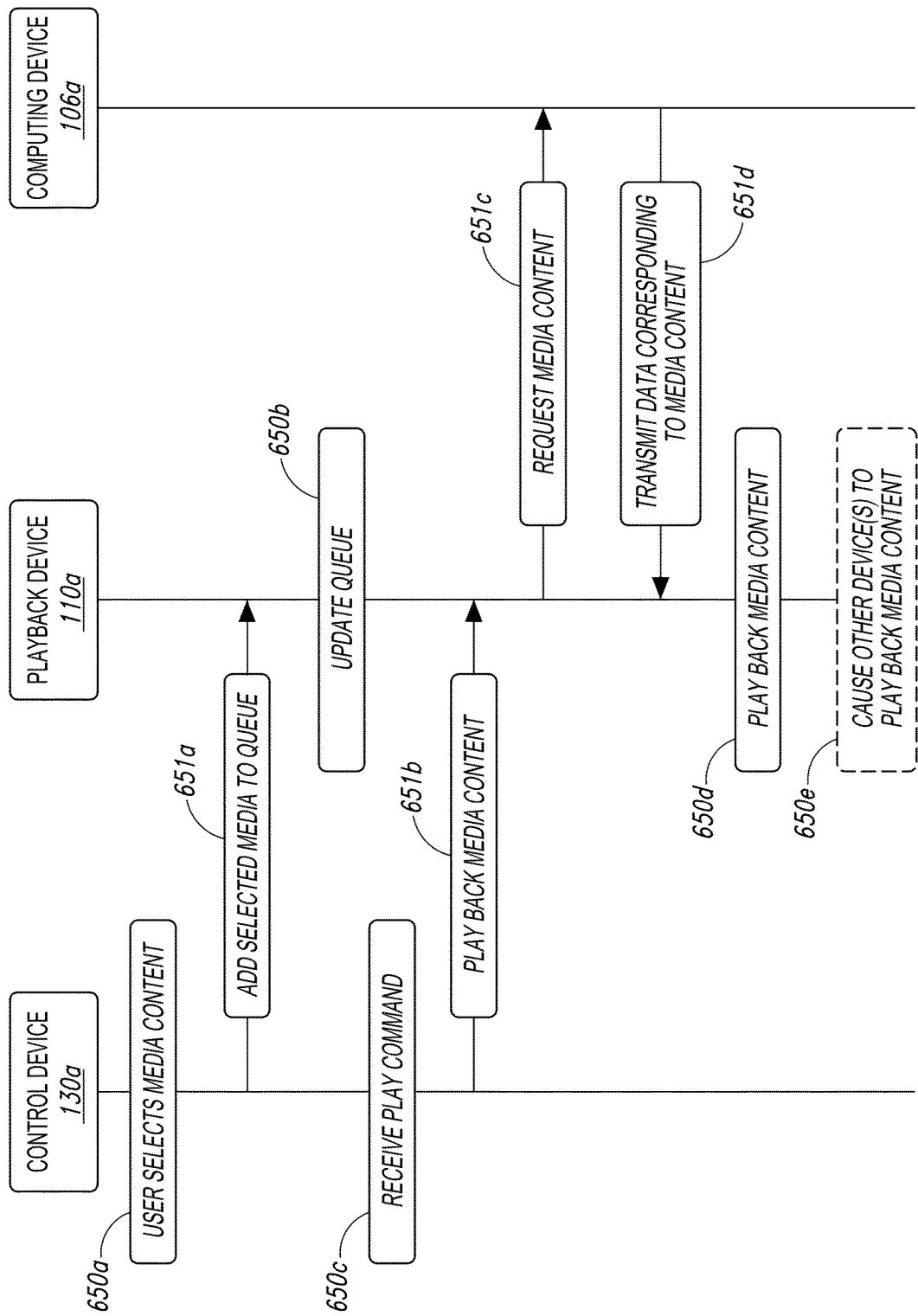
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the first computing device 106*a*, and begin playback of the selected media content in response to a message from the playback device 110*a* such that all of the devices in the group play back the selected media content in synchrony.

IV. Overview of Example Embodiments

As described above, older playback devices may eventually become incapable of operating in certain modes, such as a group coordinator mode, a group member mode, and/or a standalone mode, that may directly impact the ability of such playback devices to perform one or more core functions (e.g., playback audio from a streaming media service). Accordingly, certain functions may be offloaded from those older playback devices to a more capable device so as to maintain a core level of functionality expected by an end user. In such instances, the older playback devices may function in a lite mode variant of one or more modes (e.g., group coordinator mode, a group member mode, and/or a standalone mode) that has a lesser computational burden. Further, another device and/or system that is more computationally capable than the older playback device may operate in a super mode variant of one or more modes (e.g., group coordinator mode, a group member mode, and/or a standalone mode) that has a higher computational burden.

Figure 7:
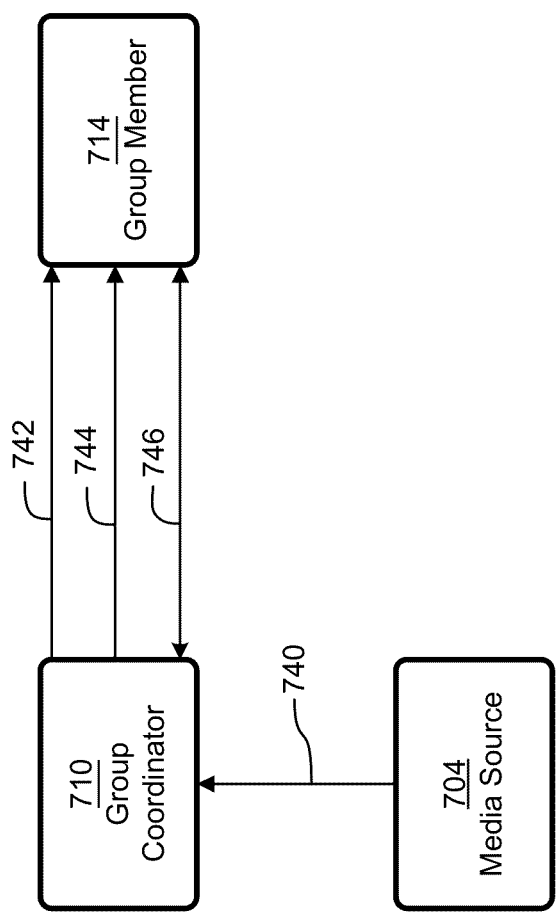
FIG. 7 shows an example configuration of a media playback group configured for synchronization.

FIG. 7 shows an example configuration of a media playback group 700 configured for synchronous playback of media. As shown, the playback group 700 comprises a first device (e.g., a first playback device) operating in a group coordinator mode, referred to as group coordinator 710, and a second device (e.g., a second playback device) operating in a group member mode, referred to as group member 714. Although the playback group 700 shows only a single group member 714, embodiments can include two, three, four, five, or many more group members (not shown). The playback group 700 may receive the media for playback from a media source 704. The media source 704 may comprise any of the media sources disclosed herein, including but not limited to streaming media sources available via the Internet or any other source of media content now known or later developed. The media information 740 may comprise any of the media content disclosed herein, including but not limited to streaming media content available via the Internet from streaming media sources.

In operation, the group coordinator 710 (*i*) receives media information 740 from the media source 704 via a communications link between the media source 704 and the group coordinator 710, (ii) provides media information 742 to the group member 714 (and possibly additional playback devices (not shown)), and (iii) plays media content based on the media information 742 in synchrony with the group member 714 (and possibly additional playback devices (not shown)).

In some instances, the group coordinator 710 receives the stream of packets comprising the media information 740 (which may or may not be encoded) from the media source 704 and extracts the media information 740 from the incoming stream on a packet-by-packet basis. That is, when the group coordinator 710 receives a first packet comprising the media information 740 from the media source 704, the group coordinator 710 extracts the portion(s) of media information 740 contained within that packet. The group coordinator 710 continues to extract the media information 740 from the packets as they arrive (or substantially as they arrive) on a packet-by-packet basis (or frame-by-frame or cell-by-cell, depending on how the media information 740 is packaged).

While the group coordinator 710 continues to receive the first stream of data comprising the media information 740 (i.e., the incoming stream) and extract the media information 740 from the incoming stream, the group coordinator 710 generates and transmits a second stream of data (i.e., the outgoing stream) comprising portions of extracted media information 742 to at least the group member 714 (and perhaps also to additional playback devices (not shown)). In example 700, the group coordinator 710 transmits the second stream (the outgoing stream) comprising portions of extracted media information 742 to the group member 714 via a LAN such as a WLAN (e.g., a WIFI network). However, the second stream could be transmitted by any type of communications link now known or later developed that is suitable for transmitting data. In some embodiments, the group coordinator 710 (*i*) receives the incoming stream from the media source 704 via a first communication interface (e.g., an interface configured to facilitate communication via at least one cellular network such as an LTE or 5G network and/or at least one PAN), and (ii) transmits the outgoing stream to at least the group member 714 via a second communication interface (e.g., an interface configured to facilitate communication via at least one WLAN) that is different than the first wireless interface. In other embodiments, the group coordinator 710 receives the incoming stream from the media source 704 and (ii) transmits the outgoing stream to at least the group member 714 via a single communication interface (e.g., an interface configured to facilitate communication via at least one WLAN).

In operation, the outgoing stream comprises (i) portions of the media information extracted from the incoming stream and (ii) playback timing information, wherein the playback timing information comprises playback timing for the portions of the media information extracted from the incoming stream. In some embodiments, the outgoing stream may additionally comprise clock timing information. In some embodiments, however, the group coordinator 710 may transmit clock timing information to the group member 714 separately from the outgoing stream.

In particular, in addition to the portions of media information 742, the group coordinator 710 also transmits playback timing information 744 for the portions of the media information 742 and clock timing information 746 to the group member 714 (and perhaps additional playback devices (not shown)). In operation, the group coordinator 710 uses the playback timing information 744 and the clock timing information 746 to play media content based on the media information 742 in synchrony with at least the group member 714 as described herein.

In the playback group 700, and in connection with generating the outgoing stream, the group coordinator 710 uses its own clock timing information 746 (i.e., clock timing of a clock of the group coordinator 710) to generate the playback timing information 744 for the media information 742.

In some embodiments, the group coordinator 710 generates the playback timing information 744 for the media information 742 by adding a "timing advance" to a current clock time of the local reference clock that the group coordinator 710 uses for generating the playback timing information 744 for the media information 742. In some embodiments, the playback timing for a frame or packet of media information 742 corresponds to a future time, relative to a reference clock time, that the portion(s) of media information 742 in the packet (or frame) is to be played.

In some embodiments, the timing advance that the group coordinator 710 adds to its own clock timing information 746 to generate a future time for the playback timing information 744 is based on an amount of time that is greater than or equal to the sum of (i) the network transit time required for packets transmitted from the group coordinator 710 to arrive at the group member 714 and (ii) the amount of time required for the group member 714 to process received packets for playback.

In some embodiments, the group coordinator 710 determines the timing advance by sending one or more test packets to the group member 714 and receiving test response packets back from the group member 714 in response to the test packets. In some embodiments, the group coordinator 710 and the group member 714 can negotiate a timing advance via one or more test and response messages. In some embodiments with more than two playback devices, the group coordinator 710 determines the timing advance by exchanging test and response messages with one or more (or all) of the playback devices, and then setting a timing advance that is sufficient for the playback device having the longest total of network transit time and packet processing time.

In some embodiments, the timing advance is less than about 100 milliseconds. In some embodiments, the timing advance is less than about 50-80 milliseconds. And in still further embodiments, the timing advance is less than about 20 milliseconds. In some embodiments, the timing advance remains constant after being determined, or at least constant during the duration of a synchronous playback session or perhaps constant during the duration that the synchrony group is in existence or in a particular configuration (recall that synchrony groups can be formed, changed, disbanded, etc.).

In other embodiments, the group coordinator 710 can change the timing advance in response to a request from a receiving playback device indicating that (i) a greater timing advance is required, e.g., because the receiving playback device is receiving packets comprising portions of media information 742 after the time for playing the portions (specified by the playback timing information 744 for the portions of media information 742), or because the receiving playback device is receiving portions of media information 742 after other devices have already played the portions of media information, or (ii) a shorter timing advance would be sufficient, e.g., because the receiving device is buffering more packets comprising portions of media information than necessary to provide consistent, reliable playback.

After determining the playback timing information 744 for a packet, frame, and/or sample of the media information 742, the group coordinator 710 transmits the packet/frame/sample of media information 742 and the playback timing information 744 for the packet/frame/sample of media information 742 to the group member 714. Because in the playback group 700, the group coordinator 710 uses its own local clock timing to generate the playback timing information 744 for the media information 742, the group coordinator 710 also transmits its clock timing information 746 to the group member 714.

The group member 714 uses the clock timing information 746 of the group coordinator 710 and the second playback device's 706 own clock timing to generate a "timing offset." Because the group member 714 uses the playback timing information 744 and the clock timing information 746 received from the group coordinator 710 to play the media information 742, the group member 714 in this instance uses remote playback timing and remote clock timing to play media content based on the media information 742.

In some embodiments, one or more (or all) of the following steps occur in connection with the group member 714 generating the "timing offset" based the clock timing information 746 of the group coordinator 710 and the second playback device's 706 own clock timing.

First, the group coordinator 710 generates a clock timing indication (e.g., a timestamp or other indication) at time, t, and transmits that clock timing indication to the group member 714 (e.g., as part and/or all of the clock timing information 746). Next, when the group member 714 receives the clock timing indication from the group coordinator 710, the group member 714 determines the difference between a local clock at the group member 714 and the time, t, indicated in the clock timing indication. The group member 714 uses this determined "timing offset" to play back media content based on portions of media information 742 in synchrony with the group coordinator 710.

In some embodiments, the group coordinator 710 transmits the clock timing information 746 to the group member 714 at least once at the start of a synchronous playback session. In some embodiments, because clocks at the group coordinator 710 and the group member 714 are susceptible to clock drift (e.g., frequency and/or phase drift), the group coordinator 710 transmits the clock timing information 746 to the group member 714 periodically or at least more than a few times during the course of a synchronous playback session. For example, the group coordinator 710 may transmit the clock timing information 746 to the group member 714 every few milliseconds, every few tens of milliseconds, every few hundreds of milliseconds, every few seconds, every few minutes, and so on.

After transmitting at least some frames (or packets) comprising at least portions of the media information 742, the playback timing information 744, and the clock timing information 746 to the group member 714, the group coordinator 710 and the group member 714 perform the following functions to play back media content in synchrony with each other.

The group coordinator 710 plays an individual frame (or packet) comprising portions of the media information 742 when the local clock at the group coordinator 710 that was used for generating the playback timing information 744 reaches the time specified in the playback timing information 744 for that individual frame (or packet) comprising the media information 742. For example, recall that when generating playback timing for an individual frame (or packet), the "sourcing" playback device (i.e., the group coordinator 710 in FIG. 7) adds a "timing advance" to the current clock time of the local reference clock used for generating the playback timing. So, if the timing advance for an individual frame is, for example, 30 milliseconds, then the group coordinator 710 ultimately plays media content corresponding to the portion (e.g., a sample or set of samples) of media information 742 in an individual frame (or packet) 30 milliseconds after creating the playback timing for that individual frame (or packet).

And the group member 714 plays media content corresponding to the media information 742 in each frame (or packet) when the current time of a local clock (at the group member 714) that the group member 714 is using to play the media information 742 reaches the playback timing information 744 for that frame (or packet), taking into account the previously-determined "timing offset."

Recall that the group member 714 calculates (or otherwise determines) a "timing offset" that corresponds to a difference between (a) the "reference" clock at the group coordinator 710 that the group coordinator 710 used to generate the clock timing information 746 (and the playback timing information 744) and (b) the "local" clock at the group member 714 that the group member 714 uses to play the media information 742. The group member 714 uses this timing offset when playing back media content based on the media information 742.

In particular, the group member 714 generates new playback timing (specific to the group member 714) for individual frames (or packets) of media information 742 by adding the previously determined "timing offset" to the playback time of each frame (or packet) received from the group coordinator 710. With this approach, the group member 714 converts the playback timing information 744 for the media information 742 received from the group coordinator 710 into "local" playback timing for the group member 714. And when the "local" clock that the group member 714 is using for playing back the media content reaches the determined "local" playback time for an individual frame (or packet), the group member 714 plays the media information 742 (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the media content.

Because the group coordinator 710 plays media content corresponding to frames (or packets) comprising portions of the media information 742 according to the playback timing information 744, and because the group member 714 also plays media content corresponding to frames (or packets) comprising portions of the media information 742 according to the same playback timing information 744 and the timing offset, the media content played by the group coordinator 710 and the media content played by group member 714 are played in synchrony with each other. That is, the group coordinator 710 and the group member 714 play media content in synchrony with each other based on the playback timing information 744 and clock timing information 746.

As discussed above, certain older devices may no longer be capable of operating as a group coordinator or a group member as described above with respect to FIG. 7. Instead, such devices may join a media playback group where those older devices may operate in a lite mode that is less computationally burdensome, such as operating in a lite group member mode (e.g., supported by a more computationally capable device operating as a super group coordinator). For instance, the media playback system may detect that a request has been received (e.g., from a user via a controller) to form a synchrony group that comprises one or more playback devices that fail to meet one or more threshold level(s) of computational capability (e.g., insufficient processor capability (e.g., insufficient number of cores, insufficient floating point operations per second, insufficient clock speed, and/or insufficient cache size), insufficient volatile memory capability (e.g., insufficient capacity, insufficient bandwidth, and/or insufficient clock speed), and/or insufficient non-volatile memory capability (e.g., insufficient capacity, insufficient bandwidth, and/or insufficient clock speed)). In such an instance, the media playback system may automatically identify one or more playback devices in the synchrony group that exceed the one or more threshold level(s) of computational capability to function as a super group coordinator for the synchrony group such that the one or more playback devices in the synchrony group that fail to meet the one or more threshold level(s) of computational capability can function in a lite group member mode. Should the synchrony group only comprise playback devices that fail to meet the one or more threshold level(s) of computational capability, the media playback system may automatically add another device and/or system to the synchrony group to function as the super group coordinator. In such an instance where another device and/or system is added to the synchrony group to function as the super group coordinator, that device and/or system may not render the audio being provided to the lite group members such that only the playback devices selected by the user to be part of the synchrony group render the audio.

Figure 8:
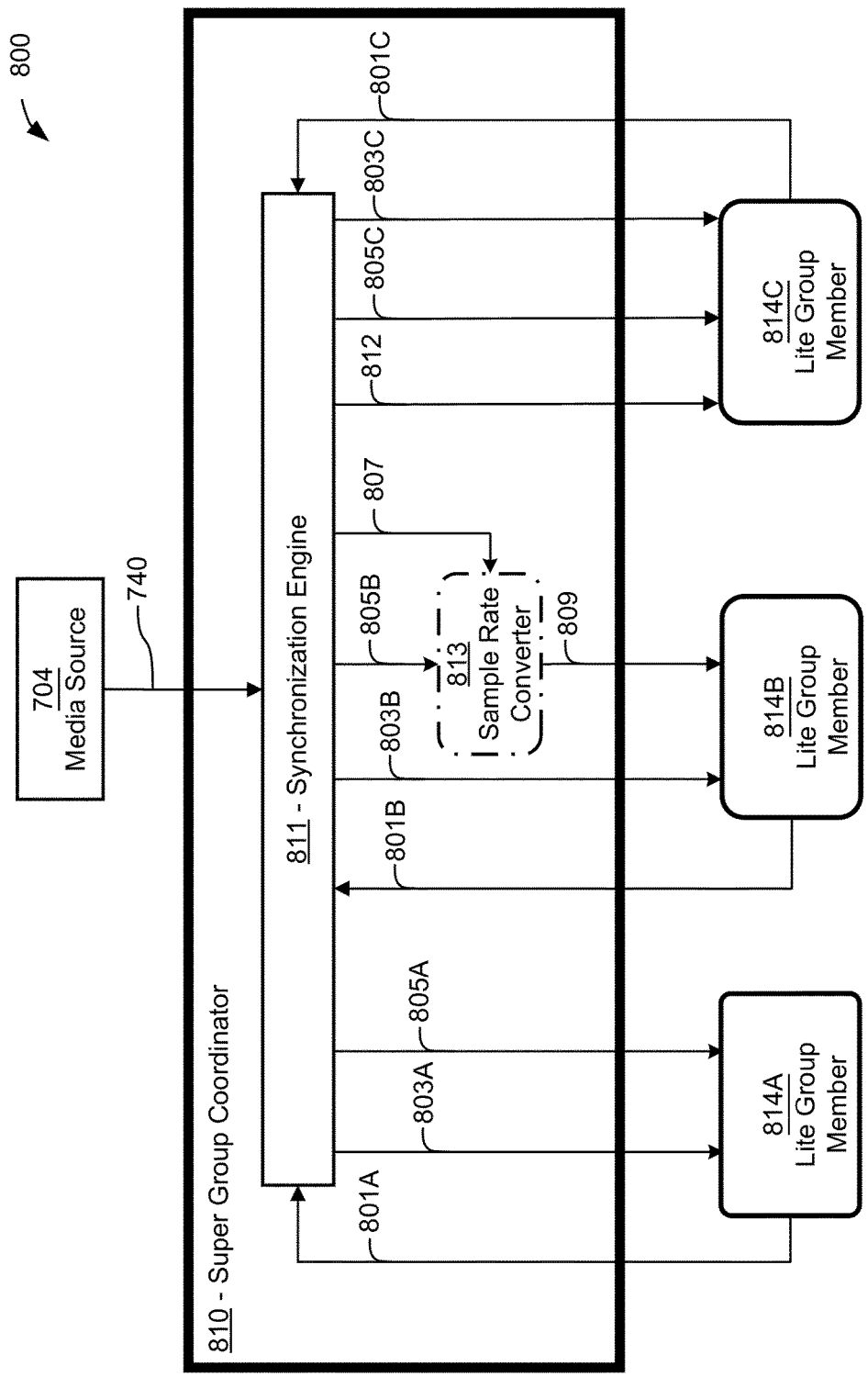
FIG. 8 shows another example configuration of a media playback group configured for synchronization.

FIG. 8 shows an example configuration of such a media playback group 800. The media playback group 800 is configured for synchronous playback of media from media source 704. As shown, the media playback group 800 comprises a first device and/or system operating in a super group coordinator mode, referred to as a super group coordinator 810, and one or more devices operating in a lite group member mode, referred to as lite group members 814A-814C. Although the media playback group 800 shows only three lite group members 814, embodiments can include one, two, four, five, or many more group members (not shown).

In operation, the super group coordinator 810 obtains media information 740 from the media source 704 and facilitates synchronous playback of the media information 740 across the lite group members 814A-814C via a synchronization engine 811. To facilitate synchronous playback, the synchronization engine 811 may generate (and output) playback timing information 803A, 803B, and 803C to each of the lite group members 814A-814C, respectively. In some instances, the synchronization engine 811 may generate and output the playback timing information 803A, 803B, and 803C using similar (or the same) techniques as described above with respect to the group coordinator 710. Additionally, the synchronization engine 811 may output media information 805A-805C (or a derivative thereof) to the lite group members 814A-814C that is to be played back.

It should be appreciated that the super group coordinator 810 need not playback the audio in synchrony with the lite group members 814A-814C. For instance, the super group coordinator 810 may be implemented as one or more cloud servers (e.g., in a data center) that are remote relative to the lite group members 814A-814C. In such an instance, the one or more cloud servers need not render the audio. In another instance, the super group coordinator 810 may be a modern playback device in a household that was not selected by the user for synchronous playback (e.g., the user only selected the three players functioning as lite group members 814A-

814C to playback in synchrony). In this instance, the super group coordinator 810 also need not render the audio.

The super group coordinator 810 may perform one or more additional operations relative to a group coordinator described above to reduce a computational burden on the lite group members 814A-814C. For instance, the super group coordinator 810 (e.g., via the synchronization engine 811) may facilitate compensation for a difference in clock rates of the lite group members 814A-814C (e.g., which would otherwise result in the lite group members 814A-814C playing back media at different rates (e.g., have different playback rates)). Without compensation, such differing playback rates may eventually become noticeable to a user (e.g., playback gaps form, echoes form, etc.).

In some examples, the synchronization engine 811 may receive playback rate information 801A-801C from the lite group members 814A-814C. For instance, the lite group members 814A-814C may transmit one or more messages to the super group coordinator 810 when particular points in the media content are reached for playback (e.g., when each of the 30 second, 1 minute, 1 minute and 30 second marks in a 2 minute audio track are reached). The synchronization engine 811 may employ such a stream of messages from the lite group members 814A-814C to identify differences in playback rates relative to a reference playback rate. Thus, the task of identifying differences in playback rate may be shifted to the super group coordinator 810 to advantageously reduce the computational burden on the lite group members 814A-814C. It should be appreciated that the reference playback rate may be, in some instances, the playback rate of one of the lite group members (e.g., lite group member 814A). In other instances, the reference playback rate may be a playback rate determined by a source that is separate from the lite group members 814A-814C.

The synchronization engine 811 may employ the determined differences in playback rates to make one or more playback adjustments to reduce such differences in playback rates. In some instances, the synchronization engine 811 may identify an appropriate modified sampling rate for at least some of the lite group members to reduce the variance in playback rates. For example, a particular lite group member 814B may be playing back audio too quickly and the synchronization engine 811 may identify a modified sample rate for a given piece of media that is higher than the original sample rate of the media (so as to slow the playback rate given a relatively constant rate at which individual samples are played back). Such a modified sample rate may be achieved using, for example, asynchronous SRC.

It should be appreciated that the particular system and/or device that generates the media content at the modified sample rate may vary based on the particular implementation and/or the particular capabilities of a give lite group member. In some instances, asynchronous SRC may be performed by the super group coordinator 810 via a sample rate converter 813 to generate modified media information 809 that may be, in turn, transmitted to the lite group member 814B for playback. In such instances, the synchronization engine 811 may output the determined modified sample rate 807 to the sample rate converter 813 and the media information 805B that is to be modified. In turn, the sample rate converter 813 may convert the same rate of the received media information 805B to match the modified sample rate 807. The sample rate converter 813 may modify the sample rate on-the-fly using asynchronous SRC. Alternatively (or additionally), the sample rate converter 813 may have access to stored media that already has modified sample rate and select the stored media with a sufficiently close (e.g., within a threshold distance and/or exactly matches) the modified sample rate 807. Thus, the sample rate converter 813 may not need to perform asynchronous SRC to output the media information at the modified sample rate.

In other instances, the asynchronous SRC may be performed by the lite group member (e.g., as shown with lite group member 814C). For instance, the synchronization engine 811 may communicate a determined modified playback rate 812 to the lite group member 814C that, in turn, the lite group member 814C may employ to modify the sample rate of the incoming media information 805A.

It should be appreciated that one or more elements shown in FIG. 8 may be implemented using software executed by one or more processors. For example, the synchronization engine 811 may be implemented via one or more computer programs that may be executed by one or more processors. Additionally (or alternatively), the sample rate converter 813 may be implemented via one or more computer programs that may be executed by one or more processors.

Figure 9:
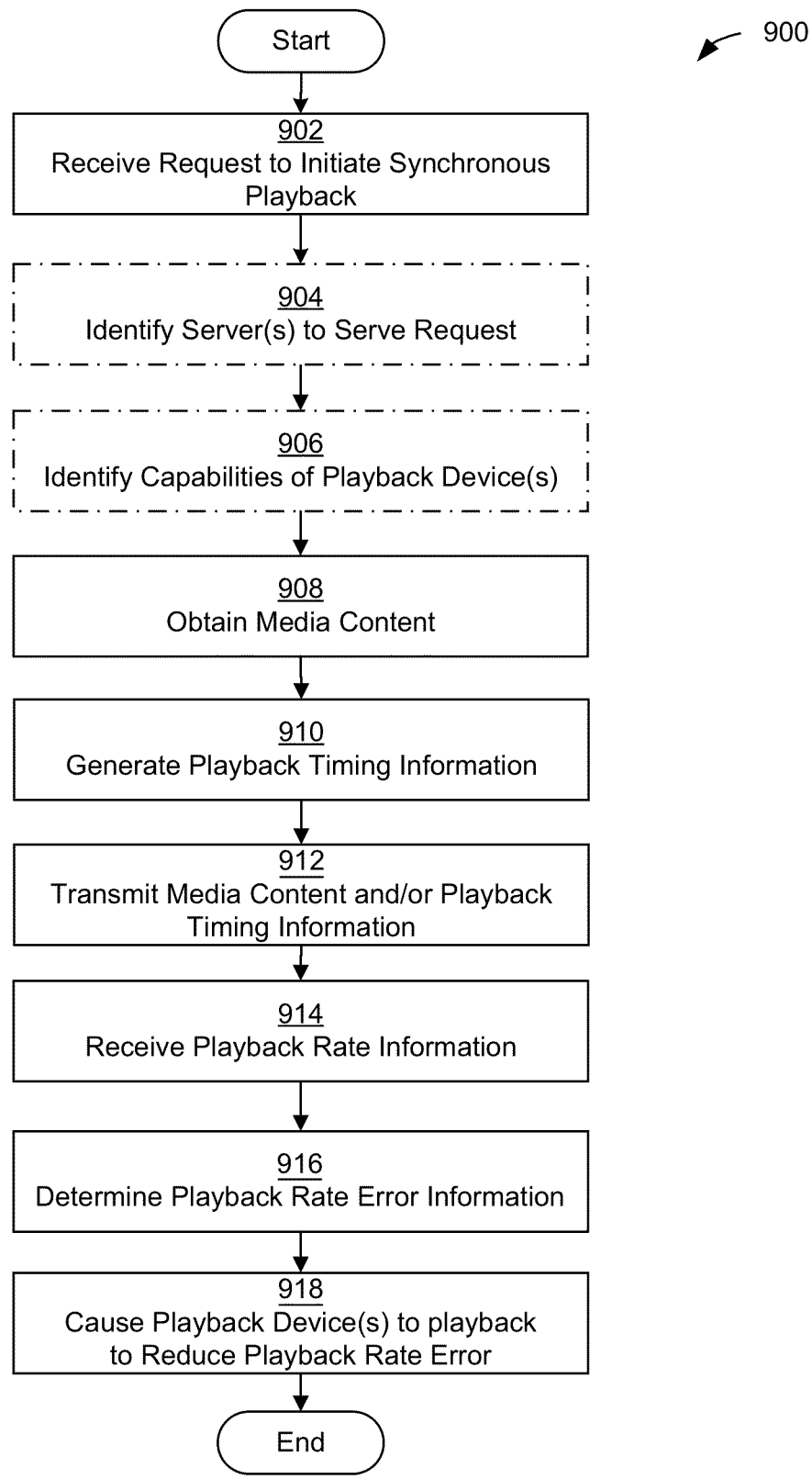
FIG. 9 shows an example method of operating a device in a super group coordinator mode.

FIG. 9 shows an example method 900 of operating a device (and/or system) in a super group coordinator mode (e.g., an example method of operating the super group coordinator 810 in FIG. 8). As shown, the method 900 comprises an act 902 of receiving a request to initiate synchronous playback, an act 904 of identifying the server(s) to serve the request, an act 906 of identifying the capabilities of the playback device(s), an act 908 of obtaining media content, an act 910 of generating playback timing information, an act 912 of transmitting media content and/or playback timing information, an act 914 of receiving playback rate information, an act 916 of determining playback rate error information, and an act 918 of causing the playback devices to reduce playback rate error.

In act 902, the super group coordinator receives a request to initiate synchronous playback. The request to initiate synchronous playback may comprise one or more of the following: (1) an indication of which playback devices(s) to include in the synchrony group; (2) an indication of the channels to be reproduced by one or more playback devices in the synchrony group (e.g., two players should playback as a stereo pair with left and right channels or the two players should playback all channels of the media content); (3) an indication of the media content to be played back (e.g., a unique identifier associated with a particular piece of media content, such as a string of characters which may be human readable (e.g., name of a song) or non-human readable (e.g., a random set of characters associated with a particular song)); and/or (4) an indication of the media source from which the media content should be obtained. The request to initiate synchronous playback may originate from any of a variety of sources. In some instances, the request may originate from a user device (e.g., in response to user manipulation of a user interface on the user device). In other instances, the request may originate from a network microphone device via a voice command (e.g., an utterance is detected by the network microphone device that contains a command to playback media on a certain set of one or more playback devices).

In instances where the super group coordinator is implemented using a set of one or more cloud servers, the super group coordinator may identify one or more server(s) to serve the request in act 904. For example, the request to initiate synchronous playback may be received by a cloud server system that comprises numerous servers across multiple geographic locations. In this example, one or more of the servers within the cloud server system may make a determination as to which servers within the cloud server system should serve the request. Such a determination may be made based on any of a variety of criteria including, for example, one or more of the following: (1) user account information associated with a user from which the request originated (e.g., certain users with a higher status and/or pay a subscription may get preferential access to certain servers, such as servers close to their geographic location, servers with higher computational capabilities, and/or servers with a lower existing workload); (2) a current workload of the servers (e.g., route requests to servers with less ongoing activity to balance the workload); and (3) a geographic location (e.g., included in the request explicitly or implicitly via, for example, a WAN Internet Protocol (IP) Address) of one or more playback devices identified in the request (e.g., identify a set of servers that are located at a data center that is closest geographically to the one or more playback devices).

In some instances where the super group coordinator supports multiple variations of a lite group member mode, the super group coordinator may identify the capabilities of the playback device in act 906. For example, the super group coordinator may support a first lite group member mode where the super group coordinator performs asynchronous SRC (e.g., the super group coordinator sends media content to the playback device that has a modified sampling rate) and a second lite group member mode where the lite group member handles the asynchronous SRC (e.g., the super group coordinator sends media content to the playback device at an unmodified sample rate and an indication of how the sample rate should be modified). In this example, the super group coordinator may assign a role (e.g., operate in a first lite group member mode or a second lite group member mode) based on the capabilities of that playback device. For instance, the super group coordinator may identify the computational capabilities of the playback device(s) in the request (e.g., memory capacity, processing capability, etc.) and assign each of the playback devices one of the variants of the lite group member modes based on their computational capabilities (e.g., playback devices with higher computational capability may be assigned variants of the lite group member modes that perform more complex functions while playback devices with lesser computational capability may be assigned variants of the lite group member modes that perform less complex functions).

In act 908, the super group coordinator may obtain the media content. The super group coordinator may obtain the media content in any of a variety of ways. For example, the request may specify a particular media source from which the media content should be obtained. In this example, the super group coordinator may obtain the media content from the media source specified in the request. In another example, the request may not specify the media source from which the media content should be obtained. In this example, super group coordinator may: (1) identify one or more media sources to which a user associated with the request (e.g., the user that initiated the request) has access to; (2) identify which of one or more media sources that the user has access to include the requested media content; and (3) obtain the media content from the media source that the user has access to and includes the requested media content. In instances where multiple media sources are available (e.g., the user has access to multiple media sources that each includes the requested media content), the super group coordinator may select one media source from the multiple available media sources based on any of a variety of information including, for example, user preference information (e.g., user prefers to use a first media streaming service over a second) and/or system preference information (e.g., preference to use a media source operated by the same company as the company that manufactured and/or sold the playback devices functioning as lite group members).

In act 910, the super group coordinator may generate playback timing information. For example, the super group coordinator may generate the playback timing information by identifying a future time at which one or more portions of the media content should be played back. Such a future time may be a "timing advance" relative to a current clock time of a reference clock (e.g., a local or remote reference clock). In some instances, the timing advance that the super group coordinator adds to the reference clock is based on an amount of time that is greater than or equal to the sum of (i) the network transit time required for packets transmitted from the super group coordinator to arrive at the lite group member(s) and (ii) the amount of time required for the lite group member(s) to process received packets for playback.

It should be appreciated that the super group coordinator and the lite group member may negotiate a timing advance based on one or more network conditions (e.g., network latency, network bandwidth, network jitter, etc.) associated with the network over which the super group coordinator communicates with the playback devices and generate the playback timing information at least in part on those identified one or more network conditions. For example, the super group coordinator and/or the lite group member may exchange one or more test and response messages to assess one or more network conditions. For instance, in some embodiments with more than two playback devices, the super group coordinator may determine the timing advance by exchanging test and response messages with one or more (or all) of the lite group members, and then set a timing advance that is sufficient for the lite group member having the longest total of network transmit time and packet processing time.

In act 912, the super group coordinator may transmit the media content and/or the playback timing information to the one or more playback devices identified in the request.

In act 914, the super group coordinator may receive playback rate information (e.g., from one or more of the playback devices identified in the request and/or playing back the media content). The playback rate information may comprise, for example, an indication of a rate at which a playback device is playing back media content. The playback rate information may comprise, for example, a series of messages from a playback device when the playback device renders a particular section of media (e.g., the playback device transmits a message when particular points within the media content are reached for playback). Such messages may be periodic (e.g., every second, ten seconds, 30 seconds, minute, etc.) or aperiodic.

In act 916, the super group coordinator may determine playback rate error information. For instance, the super group coordinator may, directly or indirectly, determine a difference between the playback rate of one or more playback devices using the playback rate information and a reference playback rate. For example, the super group coordinator may identify a reference playback rate and, based on that reference playback rate, determine a modified sampling rate for one or more playback devices using the received playback rate information such that a playback rate of the one or more playback devices more closely matches (e.g., is within a threshold range of and/or exactly matches) the reference playback rate. The super group coordinator may select the playback rate of one of the playback devices as the reference playback device (e.g., so as to obviate a need to compute a modified sampling rate for one of the playback devices).

In act 918, the super group coordinator may cause the playback device(s) to reduce the playback rate error. For example, the super group coordinator may cause the playback devices to playback at a modified sampling rate (e.g., so as to have a playback rate that closely matches the reference playback rate). For instance, the super group coordinator may modify a sample rate of the media content (e.g., using asynchronous SRC) being transmitted to a particular playback device based on the determined modified sample rate associated with that particular playback device. In another example, the super group coordinator may transmit an indication of the determined modified sample rate to the playback device and the playback device may perform asynchronous SRC to modify a sample rate of the media content being played back based on the received modified sample rate.

It should be appreciated that one or more acts in method 900 may be repeated, omitted, or otherwise modified without departing from the scope of the present disclosure. For example, one or more of acts 910, 912, 914, 916, and/or 918 may be repeated throughout a duration of playback of the media content. Additionally (or alternatively), one or more of the acts 904 and/or 906 may be omitted altogether. For example, act 904 may be omitted in situations where the super group coordinator is implemented using a single device that is on the same local network as the playback devices. In another example, act 906 may be omitted in instances where the super group coordinator only supports a single variant of lite group member mode.

Figure 10:
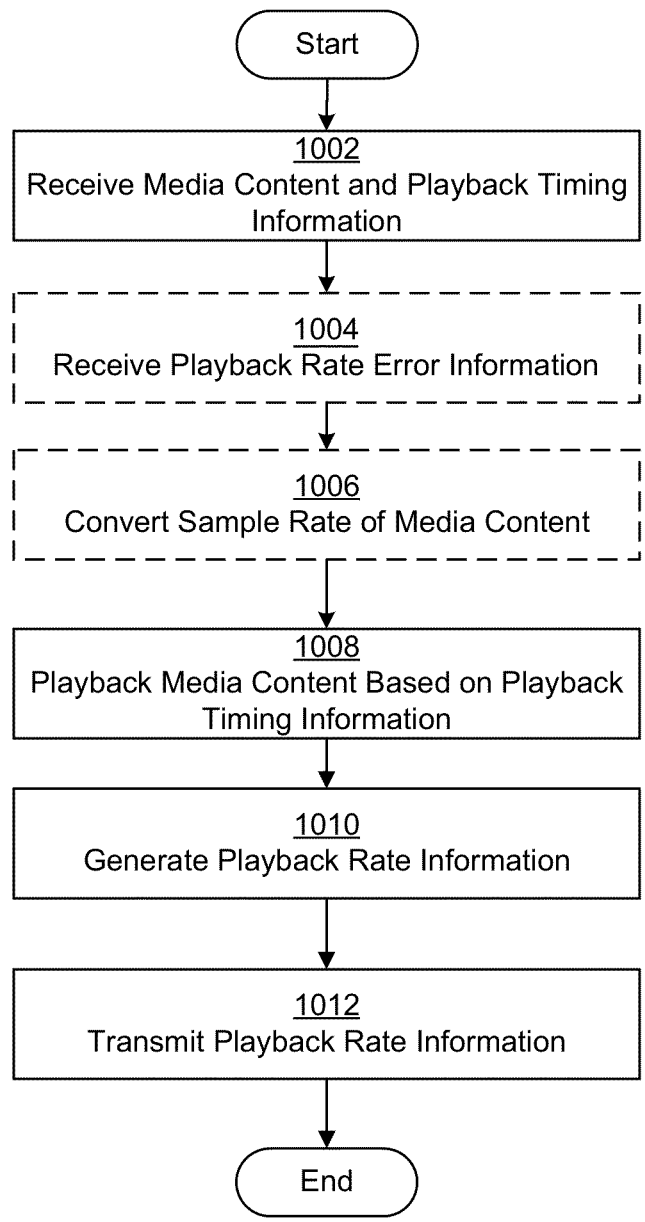
FIG. 10 shows an example method of operating a device in a lite group member mode.

FIG. 10 shows an example method 1000 of operating a device in a lite group member mode (e.g., an example method of operating one or more of the lite group members 814A-814C in FIG. 8). As shown, the method 1000 comprises an act 1002 of receiving media content and playback timing information, an act 1004 of receiving playback rate error information, an act 1006 of converting a sample rate of the media content, an act 1008 of playing back the media content based on the playback timing information, an act 1010 of generating playback rate information, and an act 1012 of transmitting playback rate information.

In act 1002, the lite group member may receive media content and playback timing information. The lite group member may receive the media content and the playback timing information from the same device and/or system (e.g., from a super group coordinator) or from different devices and/or systems (e.g., receive the playback timing from the super group coordinator and the media content directly from a media source).

In some instances, the lite group member may receive playback rate error information in act 1004. The lite group member may receive the playback rate error information from, for example, the super group coordinator. For example, the lite group member may receive an indication of a difference between its current playback rate and a reference playback rate. In another example, the lite group member may receive an indication of a modified sample rate to use for asynchronous sample rate conversion so as to reduce a playback rate error between the playback device and the reference playback rate.

In act 1006, the lite group member may convert a sample rate of the media content based on, for example, the playback rate error information. For example, the playback rate error information may comprise a modified sample rate to use for asynchronous SRC and the lite group member may modify a sample rate of the media content based on the received modified sample rate.

In act 1008, the lite group member may playback the media content based on the playback timing information. For example, the lite group member may start playback particular portions of the media content when a particular point-in-time is reached (e.g., a point-in-time indicated in the playback timing information and/or derived from the playback timing information).

It should be appreciated that the lite group member may playback the media content at an unmodified sample rate (e.g., the sample rate at which the media content was received) and/or a modified sample rate (e.g., the modified sample rate generated in act 1006).

In act 1010, the lite group member may generate playback rate information. The lite group member may transmit the generated playback rate information (e.g., to the super group coordinator) in act 1012. Such playback rate information may be generated and transmitted to the super group coordinator in any of a variety of ways. In some instances, the lite group member may transmit one or more messages to the super group coordinator when particular points in the media content are reached for playback. Such points may be evenly spaced (e.g., every 30 second interval in the media content) or unevenly spaced within the media content. In other instances, markers may be integrated into the media content that are played back (e.g., at a frequency that is inaudible to humans) and detected via one or more microphones in the playback device. In such instances, the playback device may transmit a message to the super group coordinator each time one or more markers are detected.

It should be appreciated that one or more acts in method 1000 may be repeated, omitted, or otherwise modified without departing from the scope of the present disclosure. For example, one or more of acts 1002, 1004, 1006, 1008, 1010, and/or 1012 may be repeated throughout a duration of playback of the media content. Additionally (or alternatively), one or more of the acts 1004 and/or 1006 may be omitted altogether.

V. Conclusion

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example Features (Feature 1) A computing system comprising: a communication interface configured to facilitate communication via at least one Wide Area Network (WAN); at least one processor; at least one non-transitory computer-readable medium; program instructions stored on the at least one non-transitory computer-readable medium that are executable by the at least one processor such that the computing system is configured to: receive, via a WAN, a request to initiate synchronous playback of media content on a plurality of playback devices; obtain the media content from a media source; generate playback timing information associated with the media content; transmit, via the WAN, the media content and the playback timing information to the plurality of playback devices for playback in synchrony; while the plurality of playback devices playback the media content in synchrony, receive, via the WAN, playback rate information from each of the plurality of playback devices indicative of a rate of playback of the respective playback device; and determine a modified sample rate of the media content for at least one playback device of the plurality of playback devices based on the playback rate information received from each of the plurality of playback devices; and cause the at least one playback device to playback the media content at the modified sample rate to maintain synchrony between the plurality of playback devices.

(Feature 2) The computing system of feature 1, wherein the modified sample rate of the media content is not an integer multiple of an initial sample rate of the media content.

(Feature 3) The computing system of any of features 1-2, wherein causing the at least one playback device to playback the media content at the modified sample rate comprises: modifying the sampling rate of the media content based on the modified sample rate; and transmitting, via the WAN, the media content with the modified sample rate to the at least one playback device.

(Feature 4) The computing system of any of features 1-2, wherein causing the at least one playback device to playback the media content at the modified sample rate comprises: transmitting, via the WAN, the media content (e.g., at an initial sample rate) and an indication of the modified sample rate to the at least one playback device.

(Feature 5) The computing system of any of features 1-2, wherein causing the at least one playback device to playback the media content at the modified sample rate comprises: determining a computational capability of the at least one playback device (e.g., capability of a processor (e.g., number of cores, floating point operations per second, clock speed, cache size, etc.), volatile memory (e.g., capacity, bandwidth, clock speed, etc.), and/or non-volatile memory (e.g., capacity, bandwidth, clock speed, etc.)); and causing the at least one playback device to playback the media content at the modified sample rate based on the determined computational capability of the at least one playback device.

(Feature 6) The computing system of feature 5, wherein causing the at least one playback device to playback the media content at the modified sample rate based on the determined computational capability of the at least one playback device comprises: when the computational capability of the at least one playback device exceeds a threshold, transmitting, via the WAN, the media content (e.g., at an initial sample rate) and an indication of the modified sample rate to the at least one playback device.

(Feature 7) The computing system of any of features 5-6, wherein causing the at least one playback device to playback the media content at the modified sample rate comprises: when the computational capability of the at least one playback device does not exceed a threshold, modifying the sampling rate of the media content using asynchronous sample rate conversion based on the modified sample rate; and transmitting, via the WAN, the media content with the modified sample rate to the at least one playback device.

(Feature 8) The computing system of any of features 1-7, wherein the computing system comprises at least one cloud server.

(Feature 9) The computing system of any of features 1-8, wherein the computing system does not playback the media content.

(Feature 10) A playback device having a plurality of modes of operation, wherein the playback device comprises: a communication interface configured to facilitate communication over at least one network; at least one audio amplifier configured to drive at least one transducer; at least one processor; at least one non-transitory computer-readable medium; and program instructions stored on the at least one non-transitory computer-readable medium that are executable by the at least one processor such that the playback device is configured to: (a) while the playback device operates in a first mode (e.g., a lite group member mode), (i) receive audio content and playback timing information from at least one external device that does not playback the audio content; (ii) playback the audio content in synchrony with at least one second playback device using the playback timing information; (iii) generate playback rate information; and (iv) transmit the playback rate information to the at least one external device that does not playback the audio content (e.g., a super group coordinator); (b) while the playback device operates in a second mode (e.g., a group member mode) of the plurality of modes, (i) receive audio content and playback timing for the audio content from at least one second device; (ii) play the audio content in synchrony with at least the second playback device based on the estimated clock rate error, the second clock timing information, and the playback timing for the audio content; and (c) while the playback device operates in a third mode (e.g., a group coordinator mode) of the plurality of modes, (i) receive audio content from an audio source; (ii) generate playback timing information for the audio content; (iii) transmit portions of the audio content and playback timing information for the portions of the audio content to at least a second playback device; and (iv) playback the audio content in synchrony with at least the second playback device using the playback timing information.

(Feature 11) A playback device having a plurality of modes of operation, wherein the playback device comprises: a communication interface configured to facilitate communication over at least one network; at least one audio amplifier configured to drive at least one transducer; at least one processor; at least one non-transitory computer-readable medium; and program instructions stored on the at least one non-transitory computer-readable medium that are executable by the at least one processor such that the playback device is configured to: (a) while the playback device operates in a first mode (e.g., a lite group member mode), (i) receive audio content and playback timing information from at least one external device that does not playback the audio content; (ii) playback the audio content in synchrony with at least one second playback device using the playback timing information; (iii) generate playback rate information; and (iv) transmit the playback rate information to the at least one external device that does not playback the audio content (e.g., a super group coordinator); and (b) while the playback device operates in a second mode (e.g., a group member mode) of the plurality of modes, (i) receive audio content and playback timing for the audio content from at least one second device; and (ii) play the audio content in synchrony with at least the second playback device based on the estimated clock rate error, the second clock timing information, and the playback timing for the audio content.

(Feature 12) A computing system comprising: a communication interface configured to facilitate communication via at least one data network; at least one processor; at least one non-transitory computer-readable medium; program instructions stored on the at least one non-transitory computer-readable medium that are executable by the at least one processor such that the computing system is configured to: after receipt of a request to initiate synchronous playback of media content on a plurality of playback devices via the communication interface, obtain the media content from a media source; generate playback timing information associated with the media content; transmit, via the communication interface, the media content and the playback timing information to the plurality of playback devices for playback in synchrony; while the plurality of playback devices playback the media content in synchrony and after receipt of playback rate information from at least one of the plurality of playback devices indicative of a rate of playback of the respective playback device, (i) determine a modified sample rate of the media content for the at least one playback device based on the playback rate information; and (ii) cause the at least one playback device to playback the media content at the modified sample rate to maintain synchrony between the plurality of playback devices.

(Feature 13) The computing system of feature 12, wherein the modified sample rate of the media content is not an integer multiple of an initial sample rate of the media content.

(Feature 14) The computing system of feature 13, wherein the program instructions that are executable by the at least one processor such that the system is configured to cause the at least one playback device to playback the media content at the modified sample rate comprises program instructions that are executable by the at least one processor such that the system is configured to: modify the sampling rate of the media content based on the modified sample rate; and transmit the media content with the modified sample rate to the at least one playback device.

(Feature 15) The computing system of feature 13, wherein the program instructions that are executable by the at least one processor such that the system is configured to cause the at least one playback device to playback the media content at the modified sample rate comprises program instructions that are executable by the at least one processor such that the system is configured to: transmit the media content and an indication of the modified sample rate to the at least one playback device.

(Feature 16) The computing system of feature 12, wherein the program instructions that are executable by the at least one processor such that the system is configured to cause the at least one playback device to playback the media content at the modified sample rate comprises program instructions that are executable by the at least one processor such that the system is configured to: determine a computational capability of the at least one playback device (e.g., capability of a processor (e.g., number of cores, floating point operations per second, clock speed, cache size, etc.), volatile memory (e.g., capacity, bandwidth, clock speed, etc.), and/or non-volatile memory (e.g., capacity, bandwidth, clock speed, etc.)); and cause the at least one playback device to playback the media content at the modified sample rate based on the determined computational capability of the at least one playback device.

(Feature 17) The computing system of feature 16, wherein the program instructions that are executable by the at least one processor such that the system is configured to cause the at least one playback device to playback the media content at the modified sample rate based on the determined computational capability of the at least one playback device comprises program instructions that are executable by the at least one processor such that the system is configured to: when the computational capability of the at least one playback device exceeds a threshold, transmit the media content and an indication of the modified sample rate to the at least one playback device.

(Feature 18) The computing system of feature 16, wherein the program instructions that are executable by the at least one processor such that the system is configured to cause the at least one playback device to playback the media content at the modified sample rate comprises program instructions that are executable by the at least one processor such that the system is configured to: when the computational capability of the at least one playback device does not exceed a threshold, modify the sampling rate of the media content using asynchronous sample rate conversion based on the modified sample rate; and transmit the media content with the modified sample rate to the at least one playback device.

(Feature 19) The computing system of feature 12, wherein the computing system comprises at least one cloud server.

(Feature 20) The computing system of feature 12, wherein the computing system does not playback the media content.

(Feature 21) The computing system of feature 12, wherein the computing system and the plurality of playback devices are connected to a Local Area Network (LAN) and wherein the program instructions that are executable by the at least one processor such that the system is configured to transmit the media content and the playback timing information comprises program instructions that are executable by the at least one processor such that the system is configured to transmit the media content and the playback timing information over the LAN.

(Feature 22) One or more non-transitory computer-readable media comprising program instructions that are executable by at least one processor such that a system is configured to: after receipt of a request to initiate synchronous playback of media content on a plurality of playback devices, obtain the media content from a media source; generate playback timing information associated with the media content; transmit the media content and the playback timing information to the plurality of playback devices for playback in synchrony; while the plurality of playback devices playback the media content in synchrony and after receipt of playback rate information from at least one of the plurality of playback devices indicative of a rate of playback of the respective playback device, (i) determine a modified sample rate of the media content for the at least one playback device based on the playback rate information; and (ii) cause the at least one playback device to playback the media content at the modified sample rate to maintain synchrony between the plurality of playback devices.

(Feature 23) The one or more non-transitory computer-readable media of feature 22, wherein the modified sample rate of the media content is not an integer multiple of an initial sample rate of the media content.

(Feature 24) The one or more non-transitory computer-readable media of feature 23, wherein the program instructions that are executable by the at least one processor such that the system is configured to cause the at least one playback device to playback the media content at the modified sample rate comprises program instructions that are executable by the at least one processor such that the system is configured to: modify the sampling rate of the media content based on the modified sample rate; and transmit the media content with the modified sample rate to the at least one playback device.

(Feature 25) The one or more non-transitory computer-readable media of feature 23, wherein the program instructions that are executable by the at least one processor such that the system is configured to cause the at least one playback device to playback the media content at the modified sample rate comprises program instructions that are executable by the at least one processor such that the system is configured to: transmit the media content and an indication of the modified sample rate to the at least one playback device.

(Feature 26) The one or more non-transitory computer-readable media of feature 22, wherein the program instructions that are executable by the at least one processor such that the system is configured to cause the at least one playback device to playback the media content at the modified sample rate comprises program instructions that are executable by the at least one processor such that the system is configured to: determine a computational capability of the at least one playback device (e.g., capability of a processor (e.g., number of cores, floating point operations per second, clock speed, cache size, etc.), volatile memory (e.g., capacity, bandwidth, clock speed, etc.), and/or non-volatile memory (e.g., capacity, bandwidth, clock speed, etc.)); and cause the at least one playback device to playback the media content at the modified sample rate based on the determined computational capability of the at least one playback device.

(Feature 27) The one or more non-transitory computer-readable media of feature 26, wherein the program instructions that are executable by the at least one processor such that the system is configured to cause the at least one playback device to playback the media content at the modified sample rate based on the determined computational capability of the at least one playback device comprises program instructions that are executable by the at least one processor such that the system is configured to: when the computational capability of the at least one playback device exceeds a threshold, transmit the media content and an indication of the modified sample rate to the at least one playback device.

(Feature 28) The one or more non-transitory computer-readable media of feature 26, wherein the program instructions that are executable by the at least one processor such that the system is configured to cause the at least one playback device to playback the media content at the modified sample rate comprises program instructions that are executable by the at least one processor such that the system is configured to: when the computational capability of the at least one playback device does not exceed a threshold, modify the sampling rate of the media content using asynchronous sample rate conversion based on the modified sample rate; and transmit the media content with the modified sample rate to the at least one playback device.

(Feature 29) A method performed by a computing system, the method comprising: receiving a request to initiate synchronous playback of media content on a plurality of playback devices via the communication interface; obtaining the media content from a media source; generating playback timing information associated with the media content; transmitting the media content and the playback timing information to the plurality of playback devices for playback in synchrony; while the plurality of playback devices playback the media content in synchrony and after receipt of playback rate information from at least one of the plurality of playback devices indicative of a rate of playback of the respective playback device, (i) determining a modified sample rate of the media content for the at least one playback device based on the playback rate information; and (ii) causing the at least one playback device to playback the media content at the modified sample rate to maintain synchrony between the plurality of playback devices.

(Feature 30) The method of feature 29, wherein causing the at least one playback device to playback the media content at the modified sample rate comprises: modifying the sampling rate of the media content based on the modified sample rate; and transmitting the media content with the modified sample rate to the at least one playback device.

(Feature 31) The method of feature 29, wherein causing the at least one playback device to playback the media content at the modified sample rate comprises: transmitting the media content and an indication of the modified sample rate to the at least one playback device.

The invention claimed is:

1. A computing device comprising:
at least one processor;
at least one non-transitory computer-readable medium; and
program instructions stored on the at least one non-transitory computer-readable medium that are executable by the at least one processor such that the computing device is configured to:
operate in a first mode wherein the computing device is responsible for transmitting, to each playback device of a synchrony group, (i) media content and (ii)

respective playback timing information for synchronous playback of the media content between playback devices of the synchrony group;

after a first playback device with a different capability than at least one other playback device of the synchrony group has joined the synchrony group, begin to operate in a second mode wherein the computing device is responsible for causing one or more of the playback devices of the synchrony group to modify playback of the media content based on a respective playback device capability in order to maintain synchrony of playback of the media content between the playback devices of the synchrony group; and while operating in the second mode, (i) determine a modified sample rate at which the first playback device is to play back the media content to maintain synchrony of playback of the media content between the playback devices of the synchrony group, and (ii) cause the first playback device to play back the media content at the modified sample rate.

2. The computing device of claim 1, wherein the computing device is configured to (i) communicate with playback devices of a media playback system comprising the playback devices of the synchrony group but (ii) not play back media content in synchrony with the playback devices of the synchrony group.

3. The computing device of claim 2, wherein the computing device is a remote computing device.

4. The computing device of claim 1, wherein the computing device is a playback device of the synchrony group, the computing device further comprising program instructions stored on the at least one non-transitory computer-readable medium that are executable by the at least one processor such that the computing device is configured to:
play back media content in synchrony with the playback devices of the synchrony group.

5. The computing device of claim 1, wherein:
the program instructions that are executable by the at least one processor such that the computing device is configured to cause the first playback device to play back the media content at the modified sample rate further comprise program instructions that are executable by the at least one processor such that the computing device is configured to:
receive, from each playback device of the synchrony group, respective playback rate information indicating a rate of playback of the media content by the playback device; and
based on the respective playback rates, identify a variance between a first playback rate of the first playback device and a second playback rate of a second playback device of the synchrony group, wherein the second playback rate matches a reference playback rate; and
the program instructions that are executable by the at least one processor such that the computing device is configured to determine the modified sample rate at which the first playback device is to play back the media content comprise program instructions that are executable by the at least one processor such that the computing device is configured to:
determine the modified sample rate of the media content for the first playback device based on the respective playback rate information of the first and second playback devices and the reference playback rate.

6. The computing device of claim 5, wherein the program instructions that are executable by the at least one processor such that the computing device is configured to cause the first playback device to play back the media content at the modified sample rate comprise program instructions that are executable by the at least one processor such that the computing device is configured to:
modify the sampling rate of the media content based on the modified sample rate; and
transmit the media content with the modified sample rate to the first playback device.

7. The computing device of claim 1, wherein the program instructions that are executable by the at least one processor such that the computing device is configured to cause the first playback device to play back the media content at the modified sample rate comprise program instructions that are executable by the at least one processor such that the computing device is configured to:
determine a computational capability of the first playback device; and
cause the first playback device to play back the media content at the modified sample rate based on the determined computational capability of the first playback device.

8. The computing device of claim 1, wherein the program instructions that are executable by the at least one processor such that the computing device is configured to cause the first playback device to play back the media content at the modified sample rate comprise program instructions that are executable by the at least one processor such that the computing device is configured to:
transmit the media content and an indication of the modified sample rate to the first playback device.

9. The computing device of claim 1, wherein the modified sample rate of the media content is not an integer multiple of an initial sample rate of the media content.

10. The computing device of claim 1, wherein the respective playback device capability of the first playback device of the synchrony group indicates that a bandwidth of the first playback device has dropped below a threshold level.

11. The computing device of claim 1, wherein the capability of the first playback device of the synchrony group indicates that a computational capability of the first playback device has dropped below a threshold level.

12. At least one non-transitory computer-readable medium, wherein the at least one non-transitory computer-readable medium comprises program instructions that, when executed by at least one processor, cause a computing device to:
operate in a first mode wherein the computing device is responsible for transmitting, to each playback device of a synchrony group, (i) media content and (ii) respective playback timing information for synchronous playback of the media content between playback devices of the synchrony group;
after a first playback device with a different capability than at least one other playback device of the synchrony group has joined the synchrony group, begin to operate in a second mode wherein the computing device is responsible for causing one or more of the playback devices of the synchrony group to modify playback of the media content based on a respective playback device capability in order to maintain synchrony of playback of the media content between the playback devices of the synchrony group; and
while operating in the second mode, (i) determine a modified sample rate at which the first playback device is to play back the media content to maintain synchrony of playback of the media content between the playback devices of the synchrony group, and (ii) cause the first playback device to play back the media content at the modified sample rate.

13. The at least one non-transitory computer-readable medium of claim 12, wherein the computing device is configured to (i) communicate with playback devices of a media playback system comprising the playback devices of the synchrony group but (ii) not play back media content in synchrony with the playback devices of the synchrony group.

14. The at least one non-transitory computer-readable medium of claim 13, wherein the computing device is a remote computing device.

15. The at least one non-transitory computer-readable medium of claim 12, wherein the computing device is a playback device of the synchrony group, and wherein the at least one non-transitory computer-readable medium further comprises program instructions that, when executed by at least one processor, cause the computing device to:
    play back media content in synchrony with the playback devices of the synchrony group.

16. The at least one non-transitory computer-readable medium of claim 12, wherein:
    the program instructions that, when executed by at least one processor, cause the computing device to cause the first playback device to play back the media content at the modified sample rate further comprise program instructions that, when executed by at least one processor, cause the computing device to:
        receive, from each playback device of the synchrony group, respective playback rate information indicating a rate of playback of the media content by the playback device; and
        based on the respective playback rates, identify a variance between a first playback rate of the first playback device and a second playback rate of a second playback device of the synchrony group, wherein the second playback rate matches a reference playback rate; and
    the program instructions that, when executed by at least one processor, cause the computing device to determine the modified sample rate at which the first playback device is to play back the media content comprise program instructions that, when executed by at least one processor, cause the computing device to:
        determine the modified sample rate of the media content for the first playback device based on the respective playback rate information of the first and second playback devices and the reference playback rate.

17. The at least one non-transitory computer-readable medium of claim 12, wherein the respective playback device capability of the first playback device of the synchrony group indicates that a bandwidth of the first playback device has dropped below a threshold level.

18. The at least one non-transitory computer-readable medium of claim 12, wherein the respective playback device capability of the first playback device of the synchrony group indicates that a computational capability of the first playback device has dropped below a threshold level.

19. A method carried out by a computing device, the method comprising:
    operating in a first mode wherein the computing device is responsible for transmitting, to each playback device of a synchrony group, (i) media content and (ii) respective playback timing information for synchronous playback of the media content between playback devices of the synchrony group;
    after a first playback device with a different capability than at least one other playback device of the synchrony group has joined the synchrony group, beginning to operate in a second mode wherein the computing device is responsible for causing one or more of the playback devices of the synchrony group to modify playback of the media content based on a respective playback device capability in order to maintain synchrony of playback of the media content between the playback devices of the synchrony group; and
    while operating in the second mode, (i) determining a modified sample rate at which the first playback device is to play back the media content to maintain synchrony of playback of the media content between the playback devices of the synchrony group, and (ii) cause the first playback device to play back the media content at the modified sample rate.

20. The method of claim 19, wherein the computing device is configured to (i) communicate with playback devices of a media playback system comprising the playback device of the synchrony group but (ii) not play back media content in synchrony with the playback devices of the synchrony group.

* * * * *